(12) United States Patent
Lee et al.

(10) Patent No.: US 11,536,974 B2
(45) Date of Patent: Dec. 27, 2022

(54) FLEXIBLE DISPLAY DEVICE AND OPTICAL DEVICE INCLUDING THE SAME

(71) Applicant: Samsung Display Co., Ltd., Yongin-si (KR)

(72) Inventors: Hyun Sup Lee, Seoul (KR); Jae Joong Kwon, Suwon-si (KR); Ju Hwa Ha, Seoul (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 17/367,566

(22) Filed: Jul. 5, 2021

(65) Prior Publication Data

US 2021/0333556 A1 Oct. 28, 2021

Related U.S. Application Data

(63) Continuation of application No. 16/803,750, filed on Feb. 27, 2020, now Pat. No. 11,054,653.

(30) Foreign Application Priority Data

Mar. 13, 2019 (KR) .................. 10-2019-0028544

(51) Int. Cl.
*G09G 3/3266* (2016.01)
*G02B 27/01* (2006.01)
*G09G 3/3258* (2016.01)

(52) U.S. Cl.
CPC ....... *G02B 27/0172* (2013.01); *G09G 3/3258* (2013.01); *G02B 2027/0123* (2013.01);
(Continued)

(58) Field of Classification Search
CPC ........ G02B 27/0172; G02B 2027/0123; G02B 2027/0178; G09G 3/001; G09G 3/3208;
(Continued)

(56) References Cited

U.S. PATENT DOCUMENTS 6,545,653 B1 4/2003 Takahara et al.
9,755,636 B2 9/2017 Wyland et al.
(Continued)

FOREIGN PATENT DOCUMENTS

CN 109448550 3/2019
CN 109637417 4/2019

OTHER PUBLICATIONS

Non-Final Office Action dated Nov. 18, 2020, issued to U.S. Appl. No. 16/803,750.
(Continued)

*Primary Examiner* — Michael J Eurice
(74) *Attorney, Agent, or Firm* — H.C. Park & Associates, PLC

(57) ABSTRACT

A flexible display device including a first display area including first data lines arranged in a first direction, first scan lines arranged in a second direction intersecting the first direction, a second display area including second data lines arranged in the first direction, second scan lines arranged in the second direction, a first circuit unit adjacent to a side of the first display area, a second circuit unit adjacent to a side of the second display area, and a third circuit unit between the first display area and the second display area.

20 Claims, 20 Drawing Sheets

(52) U.S. Cl.
CPC ... *G02B 2027/0178* (2013.01); *G09G 3/3266* (2013.01); *G09G 2310/0205* (2013.01); *G09G 2380/02* (2013.01)

(58) Field of Classification Search
CPC .............. G09G 3/3258; G09G 3/3266; G09G 2300/0426; G09G 2310/0202; G09G 2310/0205; G09G 2310/0213; G09G 2310/0281; G09G 2380/02
See application file for complete search history.

(56) References Cited

U.S. PATENT DOCUMENTS

| | | | |
|---|---|---|---|
| 10,565,941 B1 * | 2/2020 | Richards | G02B 27/0093 |
| 10,642,313 B1 | 5/2020 | Wu et al. | |
| 2004/0066363 A1 | 4/2004 | Yamano et al. | |
| 2006/0107143 A1 | 5/2006 | Kim et al. | |
| 2006/0274011 A1 | 12/2006 | Igarashi et al. | |
| 2006/0274017 A1 | 12/2006 | Nakao | |
| 2006/0279507 A1 | 12/2006 | Nakao et al. | |
| 2006/0284972 A1 | 12/2006 | Aoki et al. | |
| 2007/0001954 A1 | 1/2007 | Shishido et al. | |
| 2007/0093002 A1 | 4/2007 | Maekawa et al. | |
| 2007/0153455 A1 | 7/2007 | Kim et al. | |
| 2008/0002137 A1 | 1/2008 | Kim et al. | |
| 2008/0284719 A1 | 11/2008 | Yoshida | |
| 2009/0248344 A1 | 10/2009 | Hirabayashi et al. | |
| 2013/0257698 A1 | 10/2013 | Toya et al. | |
| 2013/0321340 A1 | 12/2013 | Seo et al. | |
| 2014/0049449 A1 * | 2/2014 | Park | G09G 3/035 29/841 |
| 2014/0306985 A1 | 10/2014 | Jeong et al. | |
| 2015/0169006 A1 | 6/2015 | Chong et al. | |
| 2015/0362776 A1 | 12/2015 | Jikumaru et al. | |
| 2016/0079333 A1 | 3/2016 | Shishido et al. | |
| 2016/0111037 A1 | 4/2016 | Kim | |
| 2016/0380627 A1 | 12/2016 | Wyland et al. | |
| 2017/0195658 A1 | 7/2017 | Jung | |
| 2017/0285844 A1 | 10/2017 | Park et al. | |
| 2017/0287394 A1 | 10/2017 | Kim et al. | |
| 2017/0288003 A1 | 10/2017 | Kim et al. | |
| 2017/0345371 A1 | 11/2017 | Son et al. | |
| 2017/0364035 A1 | 12/2017 | Tang | |
| 2017/0365217 A1 | 12/2017 | An et al. | |
| 2018/0059420 A1 * | 3/2018 | Woo | G09G 3/003 |
| 2018/0130422 A1 | 5/2018 | Jeon et al. | |
| 2018/0261155 A1 * | 9/2018 | Ota | H01L 51/5206 |
| 2019/0086669 A1 * | 3/2019 | Percival | G06F 3/013 |
| 2020/0037433 A1 * | 1/2020 | Dong | G06F 1/1652 |

OTHER PUBLICATIONS

Notice of Allowance dated Mar. 5, 2021, issued to U.S. Appl. No. 16/803,750.

* cited by examiner

FIG. 8
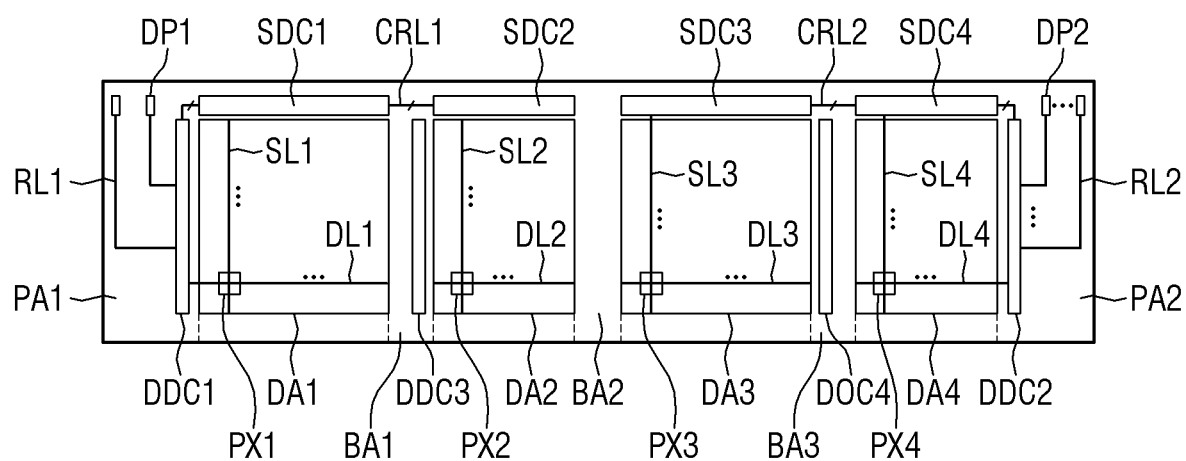
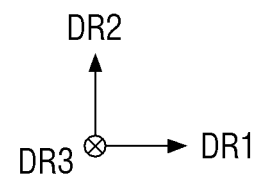

FIG. 10
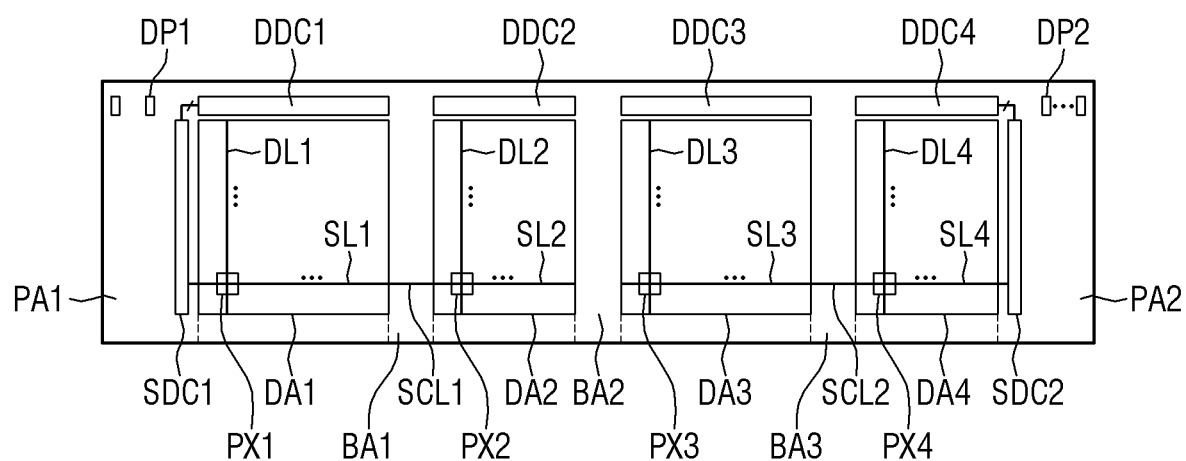
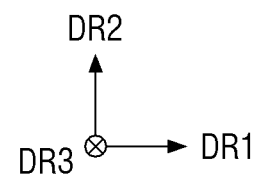

FIG. 13
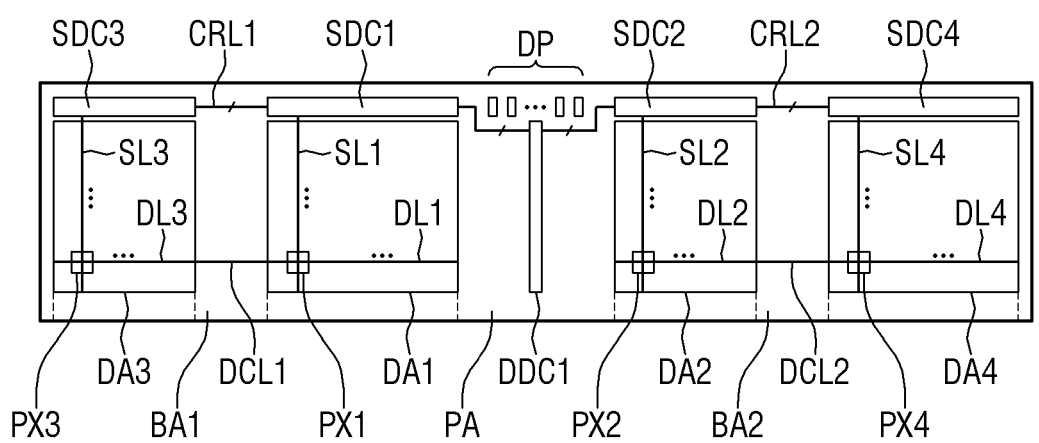
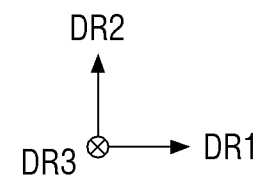

FIG. 15
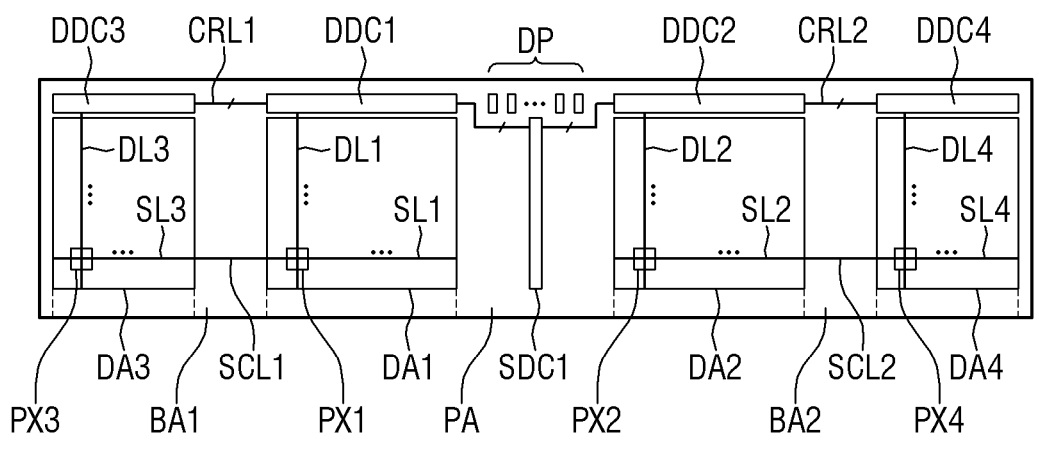
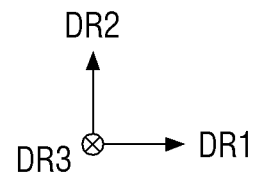

FIG. 18
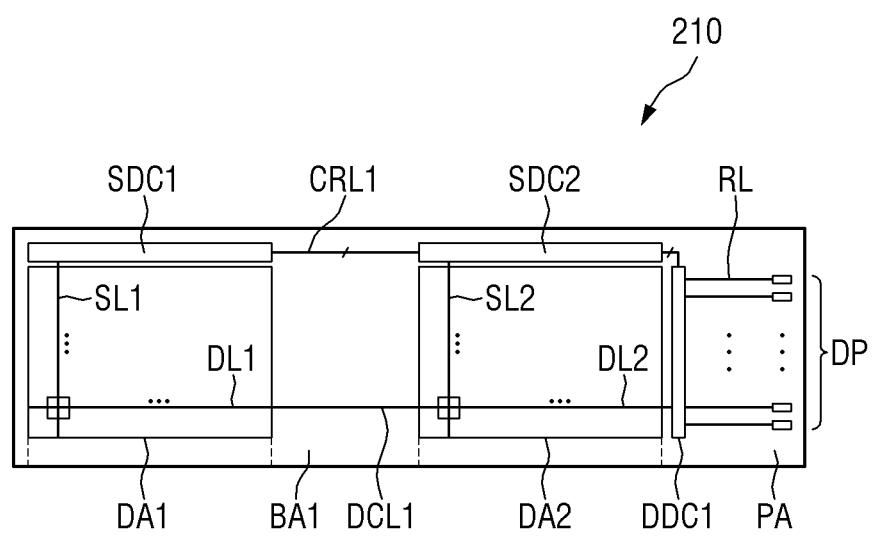
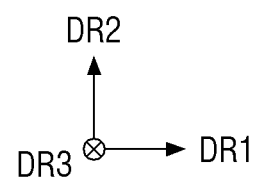

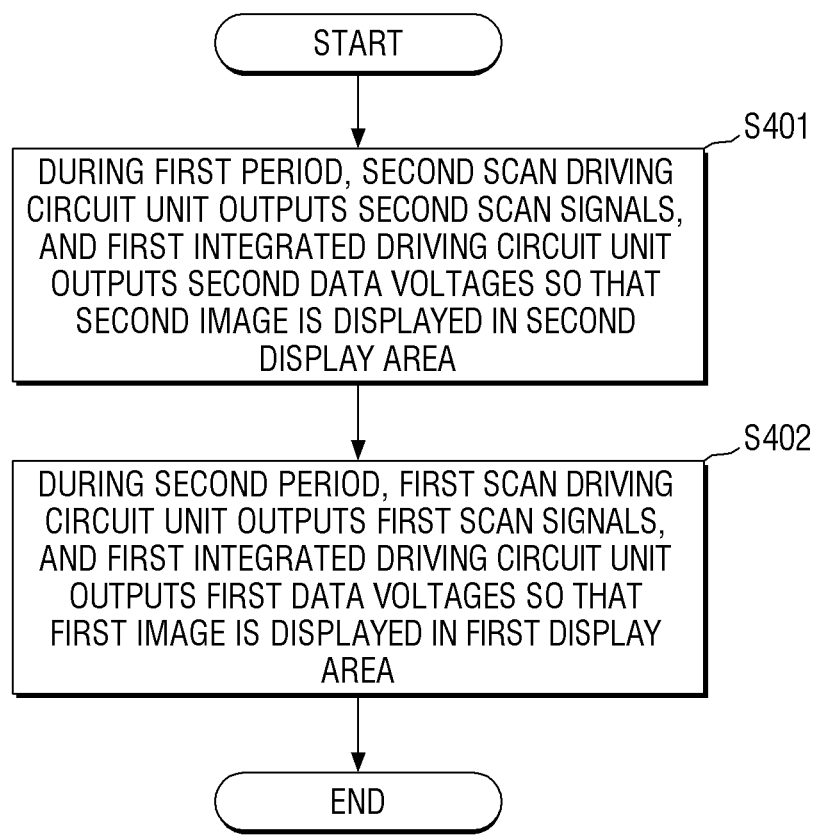

FLEXIBLE DISPLAY DEVICE AND OPTICAL DEVICE INCLUDING THE SAME

CROSS-REFERENCE TO RELATED APPLICATIONS

This application is a Continuation of U.S. patent application Ser. No. 16/803,750, filed on Feb. 27, 2020, which claims priority from and the benefit of Korean Patent Application No. 10-2019-0028544, filed on Mar. 13, 2019, each of which is hereby incorporated by reference for all purposes as if fully set forth herein.

BACKGROUND

Field

Exemplary embodiments of the invention relate generally to a flexible display device and, more specifically, to an optical device including the same.

Discussion of the Background

Augmented reality is the technology that superimposes virtual images on a real-world image actually being viewed by a user to provide a single integral image. The virtual images may be text or graphics images, and the real-world image may be information of an object that can actually be observed within the range of view of an augmented reality providing device.

The augmented reality providing device may include a display device for displaying virtual images and an optical member for providing the virtual images to the eyes of the user. The augmented reality providing device may be provided in the form of a pair of glasses, which are not only easy to carry around but also can be easily worn or taken off.

In order to provide a more realistic augmented reality, the number and the size of virtual images provided to the eyes of the user need to be increased. To this end, the area of the display device actually being viewed by the user, i.e., the field-of-view (FOV) of the user, needs to be widened.

The above information disclosed in this Background section is only for understanding of the background of the inventive concepts, and, therefore, it may contain information that does not constitute prior art.

SUMMARY

Flexible display devices constructed according to exemplary embodiments of the invention are capable of widening a field-of-view (FOV) of a user by increasing the area of a display device viewed by the user. In addition, optical devices according to exemplary embodiments are capable of widening the area of a display device viewed by a user, e.g., the FOV of the user, using a single display device.

Additional features of the inventive concepts will be set forth in the description which follows, and in part will be apparent from the description, or may be learned by practice of the inventive concepts.

A flexible display device according to an exemplary embodiment includes a first display area including first data lines arranged in a first direction, first scan lines arranged in a second direction intersecting the first direction, and first pixels arranged in regions defined by the first data lines and the first scan lines, a second display area including second data lines arranged in the first direction, second scan lines arranged in the second direction, and second pixels arranged in regions defined by the second data lines and the second scan lines, a first bending area disposed between the first and second display areas, a first circuit unit disposed adjacent to a first side of the first display area, a second circuit unit disposed adjacent to a second side of the first display area, and a third circuit unit disposed adjacent to a first side of the second display area.

The first circuit unit may be configured to apply first scan signals to the first scan lines of the first display area, the second circuit unit may be configured to apply first data voltages to the first data lines of the first display area, and the third circuit unit may be configured to apply second scan signals to the second scan lines of the second display area.

The flexible display device may further include first data connecting lines disposed in the first bending area and connected to the first data lines and the second data lines.

The first circuit unit may be further configured to apply the first scan signals to the first scan lines during a first period, and the third circuit unit may be further configured to apply the second scan signals to the second scan lines during a second period.

The second circuit unit may be configured to apply the first data voltages to the first data lines, the first connecting lines, and the second data lines during the first period, and apply second data voltages to the first data lines, the first connecting lines, and the second data lines during the second period.

The flexible display device may further include carry signal lines disposed in the first bending area and connected to the first and second circuit units.

The first circuit unit may be configured to apply a scan signal to a nearest first scan line from the second display area as a carry signal.

The flexible display device may further include a pad area including first routing lines connected to the second circuit unit and pads connected to the first routing lines, and a flexible circuit board attached on the pads, in which the second circuit unit may be disposed between the pad area and the first display area.

The flexible display device may further include a fourth circuit unit disposed in the first bending area, in which the fourth circuit unit may be configured to apply second data voltages to the second data lines of the second display area.

The first circuit unit may be configured to apply the first scan signals to the first scan lines during a first period, and the third circuit unit may be configured to apply the second scan signals to the second scan lines during a second period.

The second circuit unit may be configured to apply the first data voltages to the first data lines during the first period, and the fourth circuit unit may be configured to apply the second data voltages to the second data lines during the second period.

The flexible display device may further include first scan connecting lines disposed in the first bending area and connected to the first scan lines and the second scan lines.

The first circuit unit may be configured to apply first data voltages to the first data lines of the first display area, the second circuit unit may be configured to apply first scan signals to the first scan lines, the first scan connecting lines, and the second scan lines of the first display area, and the third circuit unit may be configured to apply second data voltages to the second data lines of the second display area.

The first display area may be disposed on a first side of the second circuit unit, and the second display area may be disposed on a second side of the second circuit unit opposing the first side of the second circuit unit.

The first circuit unit may be configured to apply first scan signals to the first scan lines of the first display area, the second circuit unit may be configured to apply first data voltages to the first data lines of the first display area and second data voltages to the second data lines of the second display area, and the third circuit unit may be configured to apply second scan signals to the second scan lines of the second display area.

The flexible display device may further include pads disposed in the first bending area and electrically connected to the second circuit unit, and a flexible circuit board attached on the pads.

The flexible display device may further include a third display area including third data lines arranged in the first direction, third scan lines arranged in the second direction, and third pixels arranged in regions defined by the third data lines and the third scan lines, in which the first bending area may be disposed between the third display area and the first display area.

An optical device according to another exemplary embodiment includes a lens including a first surface and a plurality of sides, a display panel disposed on at least two sides of the lens, and a plurality of reflective members disposed in the lens to reflect light from the display panel to the first surface, in which the display panel includes a first display area disposed on a first side of the lens to provide light to the first side of the lens, and a second display area disposed on a second side of the lens extending from one end of the first side to provide light to the second side of the lens.

The plurality of reflective members may include a first reflective member to reflect light emitted from the first display area and incident through the first side of the lens towards the first surface of the lens, and a second reflective member to reflect light emitted from the second display area and incident through the second side of the lens towards the first surface of the lens.

The display panel may further include a first bending area between the first and second display areas, a third display area disposed on a third side of the lens extending from one end of the second side of the lens to provide light to the third side of the lens, a second bending area disposed between the second and third display areas, a fourth display area disposed on a fourth side of the lens extending from one end of the third side of the lens to provide light to the fourth side of the lens, and a third bending area disposed between the third and fourth display areas.

The plurality of reflective members may further include a third reflective member to reflect light emitted from the third display area and incident through the third side of the lens towards the first surface of the lens, and a fourth reflective member to reflect light emitted from the fourth display area and incident through the fourth side of the lens towards the first surface of the lens.

The optical device may further include a first flexible circuit board attached to one end of the first display area adjacent to the fourth display area, and a second flexible circuit board attached to one end of the fourth display area adjacent to the first display area.

The display panel may further include a third display area disposed on a third side of the lens extending from the other end of the first side of the lens to provide light to the third side of the lens, a first bending area disposed between the first and third display areas, a fourth display area disposed on a fourth side of the lens extending form the other end of the second side of the lens to provide light to the fourth side of the lens, and a second bending area disposed between the second and fourth display areas.

The plurality of reflective members may include a third reflective member to reflect light emitted from the third display area and incident through the third side of the lens towards the first surface of the lens, and a fourth reflective member to reflect light emitted from the fourth display area and incident through the fourth side of the lens towards the first surface of the lens.

The optical device may further include a first flexible circuit board attached to a pad area between the first display area and the second display area.

An optical device according to still another exemplary embodiment includes a first lens including a first surface and a plurality of sides, a second lens including a first surface and a plurality of sides, a display panel including a first display area disposed on one of the sides of the first lens, a second display area disposed on one of the sides of the second lens, and a first bending area disposed between the first and second display areas, a first reflective member disposed in the first lens to reflect light from the first display area toward the first surface of the first lens, and a second reflective member disposed in the second lens to reflect light from the second display area toward the first surface of the second lens.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 8 is a development view of a first display device of FIG. 2, according to another exemplary embodiment.

FIG. 10 is a development view of a first display device of FIG. 2, according to yet another exemplary embodiment.

FIG. 13 is a development view of a first display device of FIG. 11, according to another exemplary embodiment.

FIG. 15 is a development view of a first display device of FIG. 11, according to another exemplary embodiment.

FIG. 18 is a development view of a first display device of FIG. 16, according to another exemplary embodiment.

FIG. 19 is a flowchart exemplarily illustrating a driving method of the first display device of FIG. 16.

DETAILED DESCRIPTION

Figure 1:
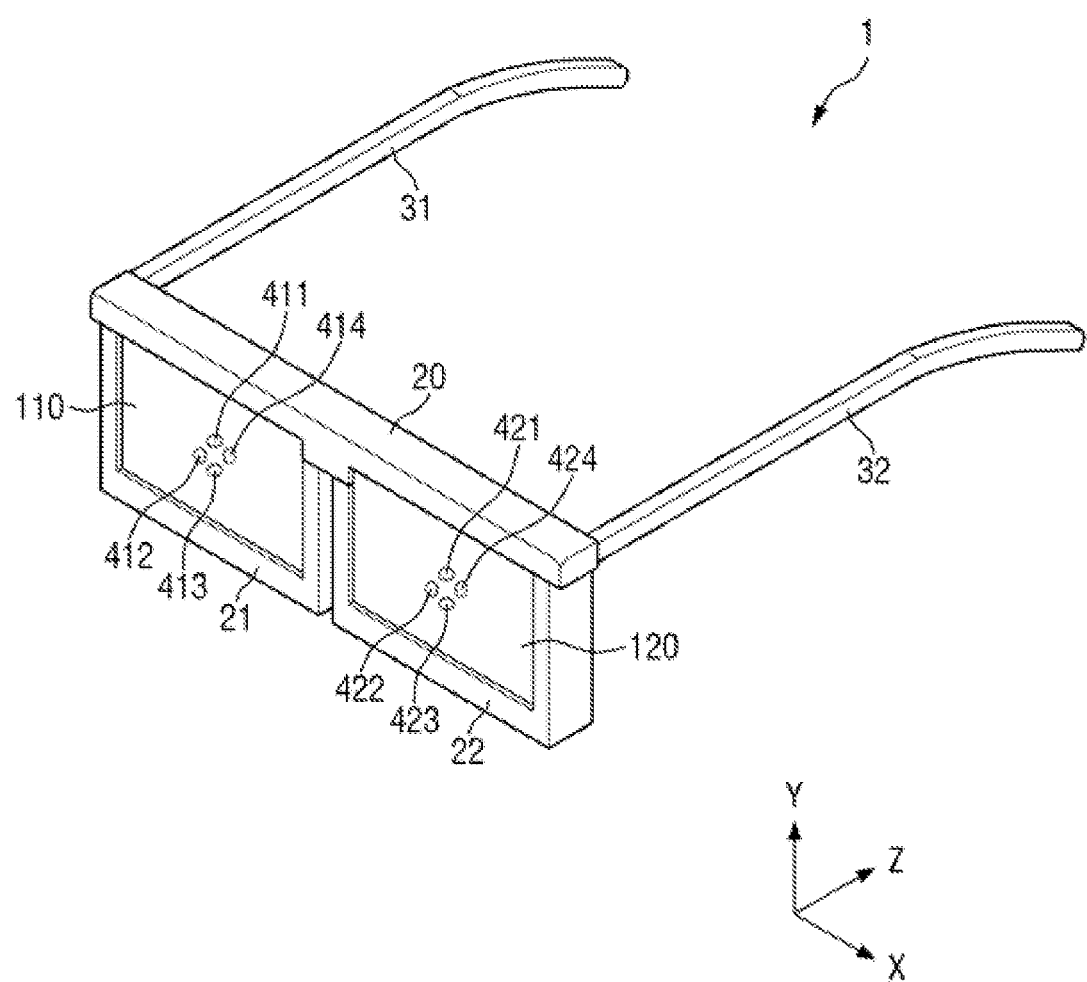
FIG. 1 is a perspective view of an optical device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
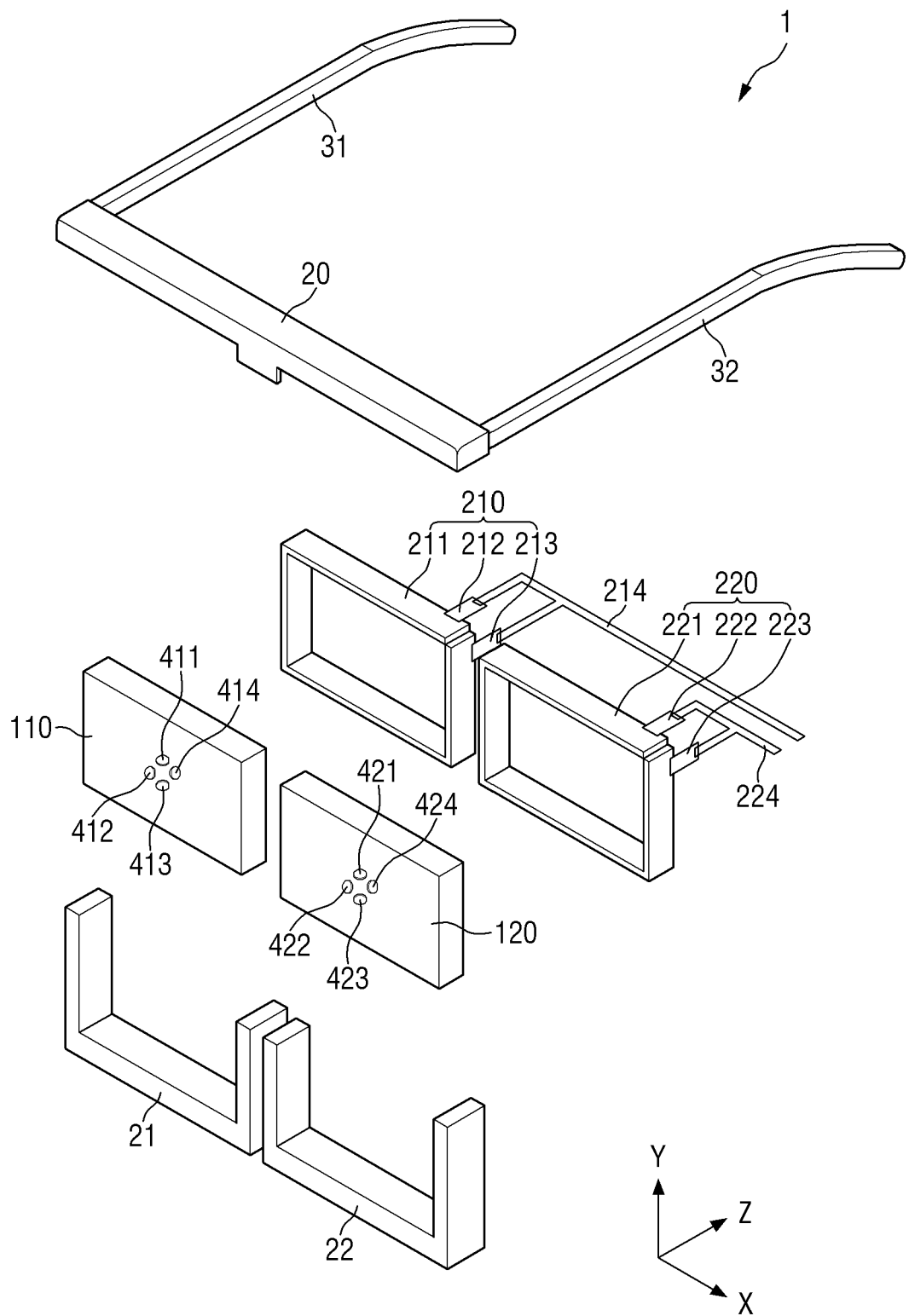
FIG. 2 is an exploded perspective view of the optical device of FIG. 1.

FIG. 1 is a perspective view of an optical device according to an exemplary embodiment. FIG. 2 is an exploded perspective view of the optical device of FIG. 1.

Referring to FIGS. 1 and 2, an optical device 1 includes a supporting frame 20, a first lens frame 21, a second lens frame 22, a first temple 31, a second temple 32, a first lens 110, a second lens 120, a first display device 210, a second display device 220, first through fourth reflective members 411, 412, 413, and 414, and fifth through eighth reflective members 421, 422, 423, and 424. The optical device 1 may be a display device for implementing an augmented reality or a virtual image.

The terms "top" and "top surface", as used herein, refer to a Z-axis direction, the terms "bottom" and "bottom surface", as used herein, refer to a direction opposite to the Z-axis direction. Also, the terms "left", "right", "above", and "below", as used herein, refer to the opposite direction of an X-axis direction, the X-axis direction, a Y-axis direction, and the opposite direction of the Y-axis direction, respectively.

The supporting frame 20 supports the first and second lenses 110 and 120 together with the first and second lens frames 21 and 22. The first lens 110 may be surrounded by the supporting frame 20 and the first lens frame 21. The second lens 120 may be surrounded by the supporting frame 20 and the second lens frame 22.

The supporting frame 20 may be disposed on the upper sides of the first and second lenses 110 and 120. The supporting frame 20 may extend in the width direction of the first lens 110 (e.g., the X-axis direction).

The first lens frame 21 may be disposed on the left, lower, and right sides of the first lens 110. The first lens frame 21 may be coupled to the supporting frame 20. The second lens frame 22 may be disposed on the left, lower, and right sides of the second lens 120. The second lens frame 22 may be coupled to the supporting frame 20. The first and second lens frames 21 and 22 may include nose pads.

FIG. 2 illustrates that the supporting frame 20, the first lens frame 21, and the second lens frame 22 are formed separately and coupled together later, however, the inventive concepts are not limited thereto. For example, in some exemplary embodiments, the supporting frame 20, the first lens frame 21, and the second lens frame 22 may be formed as one integral body.

The first temple 31 may be fixed to the left end of the supporting frame 20. The second temple 32 may be fixed to the right end of the supporting frame 20. The first and second temples 31 and 32 may be fixed to the supporting frame 20 via fixing members, such as screws.

The supporting frame 20, the first lens frame 21, the second lens frame 22, the first temple 31, and the second temple 32 may include plastic, metal, or both. In some exemplary embodiments, the first and second lens frames 21 and 22 may be omitted.

The first and second lenses 110 and 120 may be formed of glass or plastic to be transparent or semitransparent. Accordingly, a user can see a real-world image through the first and second lenses 110 and 120. In some exemplary embodiments, the first and second lenses 110 and 120 may have a refractive power in consideration of the user's eyesight.

The first and second lenses 110 and 120 may have a substantially hexagonal shape including a top surface, a bottom surface, and first through fourth sides. The top surface of the first lens 110 may be a surface that faces a right eye RE of the user, and may be a surface through which light from the first display device 210 is emitted by the first through fourth reflective members 411 through 414. The bottom surface of the first lens 110 may be the outer surface of the first lens 110. The top surface of the second lens 120 may be a surface that faces a left eye LE of the user, and may be a surface through which light from the second display device 220 is emitted by the fifth through eighth reflective members 421 through 424. The bottom surface of the second lens 120 may be the outer surface of the second lens 120.

The first and second lenses 110 and 120 are not limited to those illustrated in FIGS. 1 and 2. In some exemplary embodiments, the first and second lenses 110 and 120 may have various polygonal shapes including a first surface, a second surface, and multiple sides. In some exemplary embodiments, the first and second lenses 110 and 120 may have other various shapes other than polygonal shapes, such as cylinders, cylindroids, semi-cylinders, semi-cylindroids, collapsed cylinders, or collapsed cylindroids. Here, the collapsed cylinders or cylindroids refer to cylinders or cylindroids with a non-uniform radius.

The first through fourth reflective members 411 through 414 are disposed in the first lens 110. The fifth through eighth reflective members 421 through 424 are disposed in the second lens 120. The first through fourth reflective members 411 through 414 and the fifth through eighth reflective members 421 through 424 may be small-size mirrors, such as pin mirrors. FIGS. 1 and 2 illustrate that the first through fourth reflective members 411 through 414 and the fifth through eighth reflective members 421 through 424 have a circular cross-section, however, in some exemplary embodiments, the first through fourth reflective members 411 through 414 and the fifth through eighth reflective members 421 through 424 may have an elliptical or polygonal cross-section.

The first through fourth reflective members 411 through 414 may reflect an image displayed by the first display device 210, and provide the image to the right eye RE of the user. The fifth through eighth reflective members 421 through 424 may reflect an image displayed by the second display device 220, and provide the image to the left eye LE of the user.

The first through fourth reflective members 411 through 414 and the fifth through eighth reflective members 421 through 424 may be formed to have a smaller size than the pupil of the right eye RE or the left eye or LE. For example, the first through fourth reflective members 411 through 414 and the fifth through eighth reflective members 421 through 424 may be formed to have a diameter of 500 µm to 4 mm In this manner, since the user focuses on a real-world image, the user may not be able to recognize the first through fourth reflective members 411 through 414 and the fifth through eighth reflective members 421 through 424 easily. However, as the sizes of the first through fourth reflective members 411 through 414 and the fifth through eighth reflective members 421 through 424 decrease, the luminance of images provided from the first and second display devices 210 and 220 to the right and left eyes RE and LE of the user may be decreased. As such, the sizes of the first through fourth reflective members 411 through 414 and the fifth through eighth reflective members 421 through 424 may be set in consideration of whether the first through fourth reflective members 411 through 414 and the fifth through eighth reflective members 421 through 424 are recognizable by the user and the luminance of images provided to the user.

The first through fourth reflective members 411 through 414 and the fifth through eighth reflective members 421 through 424 may have substantially a cylindrical shape, as illustrated in FIGS. 1 and 2. In this case, the first through fourth reflective members 411 through 414 and the fifth through eighth reflective members 421 through 424 may each have two bases, one of which may be a reflective surface and the other of which may not be a reflective surface.

FIGS. 1 and 2 illustrate that four reflective members are disposed in each of the first and second lenses 110 and 120, however, the inventive concepts are not limited to a particular number of reflective members disposed in each of the first and second lenses 110 and 120. For example, in some exemplary embodiments, more than four reflective members may be disposed in each of the first and second lenses 110 and 120.

Each of the first and second display devices 210 and 220 may display virtual images for implementing an augmented reality. The first display device 210 may include a first display panel 211, a first circuit board 212, and a second circuit board 213. The second display device 220 may include a second display panel 221, a third circuit board 222, and a fourth circuit board 223.

The first display panel 211 may be disposed on multiple sides of the first lens 110. The first display panel 211 may be disposed to surround the multiple sides of the first lens 110. The first display panel 211 may be hidden by the supporting frame 20 and the first lens frame 21.

The second display panel 221 may be disposed on multiple sides of the second lens 120. The second display panel 221 may be disposed to surround the multiple sides of the second lens 120. The second display panel 221 may be hidden by the supporting frame 20 and the second lens frame 22.

The locations of the first and second display panels 211 and 221 are not limited to those illustrated in FIGS. 1 and 2.

Figure 6:
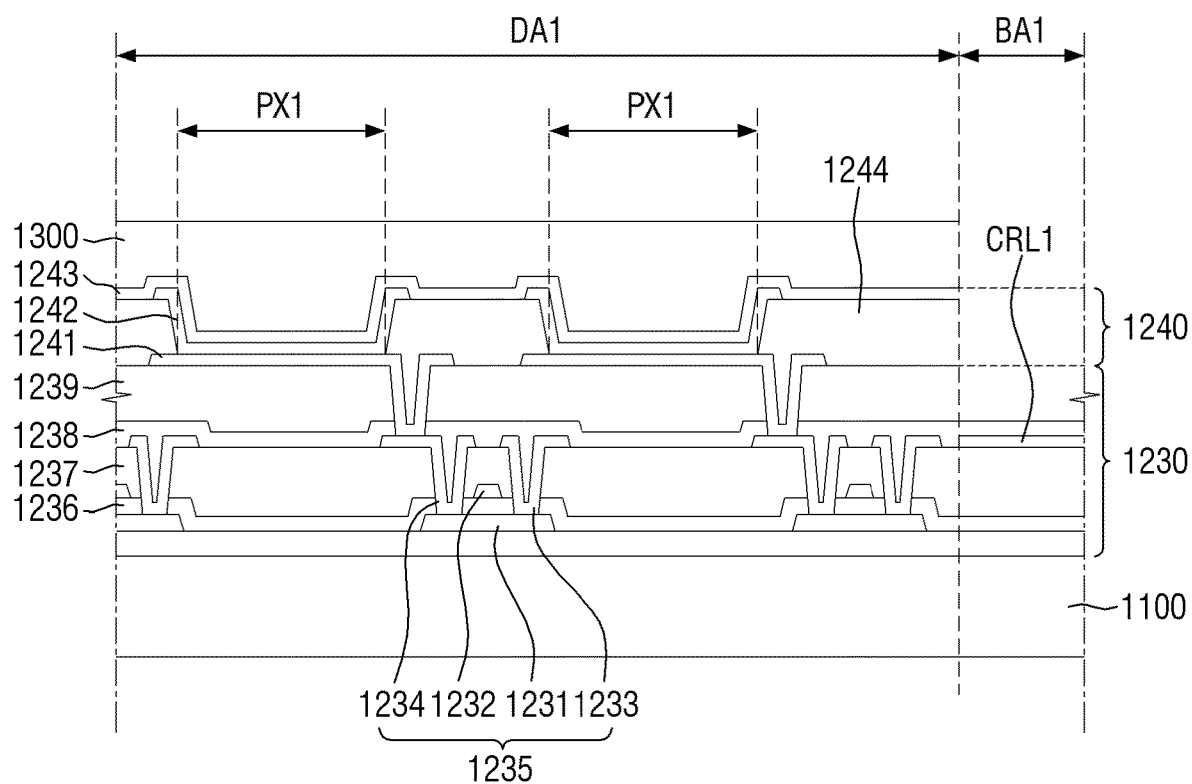
FIG. 6 is a cross-sectional view of a first display area and a first bending area of a first display panel of FIG. 5.

The first and second display panels 211 and 221 may be flexible display panels having flexibility, and may thus be bendable, foldable, or rollable. For example, the first and second display panels 211 and 221 may be organic light-emitting diode (OLED) display panels or quantum dot-OLED (QD-OLED) display panels. Hereinafter the first and second display panels 211 and 221 will be described with reference to OLED display panels, as illustrated in FIG. 6.

The first circuit board 212 and a second circuit board 213 may be attached to the first display panel 211. The third circuit board 222 and a fourth circuit board 223 may be attached to the second display panel 221. The first, second, third, and fourth circuit boards 212, 213, 222, and 223 may be flexible printed circuit boards (FPCBs), and may be bendable, foldable, or rollable.

A power supply unit for supplying power to the first and second display devices 210 and 220 may be embedded in one of the first and second temples 31 and 32. In this case, a first cable 214 for connecting the first and second circuit boards 212 and 213 to the power supply unit and a second cable 224 for connecting the third and fourth circuit boards 222 and 223 to the power supply unit may be additionally provided. When the power supply unit is embedded in the second temple 32, the first cable 214 may extend along the second temple 32. The first cable 214 may be longer than the second cable 224.

Optical path converting layers may be disposed between the first display device 210 and the sides of the first lens 110, and between the second display device 220 and the sides of the second lens 120. The optical path converting layers may adjust the path of light from the first display device 210 to travel toward the first through fourth reflective members 411 through 414. The optical path converting layers may adjust the path of light from the second display device 220 to travel toward the fifth through eighth reflective members 421 through 424. The optical path converting layers may be prism sheets including prisms, for example.

Polarizing films may be disposed between the first display device 210 and the sides of the first lens 110, and between the second display device 220 and the sides of the second lens 120. Each of the polarizing films may include a linear polarizer and a phase retardation film, such as a quarter-wave ($\lambda/4$) plate. In this case, the linear polarizer may be disposed on the sides of the first or second lens 110 or 120, and the phase retardation film may be disposed between the linear polarizer and the first or second display device 210 and 220. The polarizing films can provide light from the first display device 210 to the sides of the first lens 110, and may block light incident upon the first display device 210 from the sides of the first lens 110 from being reflected by the first display device 210 to be emitted back toward the sides of the first lens 110. Also, the polarizing films can provide light from the second display device 220 to the sides of the second lens 120, and may block light incident upon the second display device 220 from the sides of the second lens 120 from being reflected by the second display device 220 to be emitted back toward the sides of the second lens 120.

According to the illustrated exemplary embodiment of FIGS. 1 through 4, an image from the first display device 210, which is disposed on multiple sides of the first lens 110, is reflected toward the first surface of the first lens 110 by multiple reflective members, i.e., the first through fourth reflective members 411 through 414. Also, an image from the second display device 220, which is disposed on multiple sides of the second lens 120, is reflected toward the first surface of the second lens 120 by multiple reflective members, i.e., the fifth through eighth reflective members 421 through 424. Accordingly, the area of each display device actually being viewed by the user, i.e., the field-of-view (FOV) of the user, can be widened.

Figure 3:
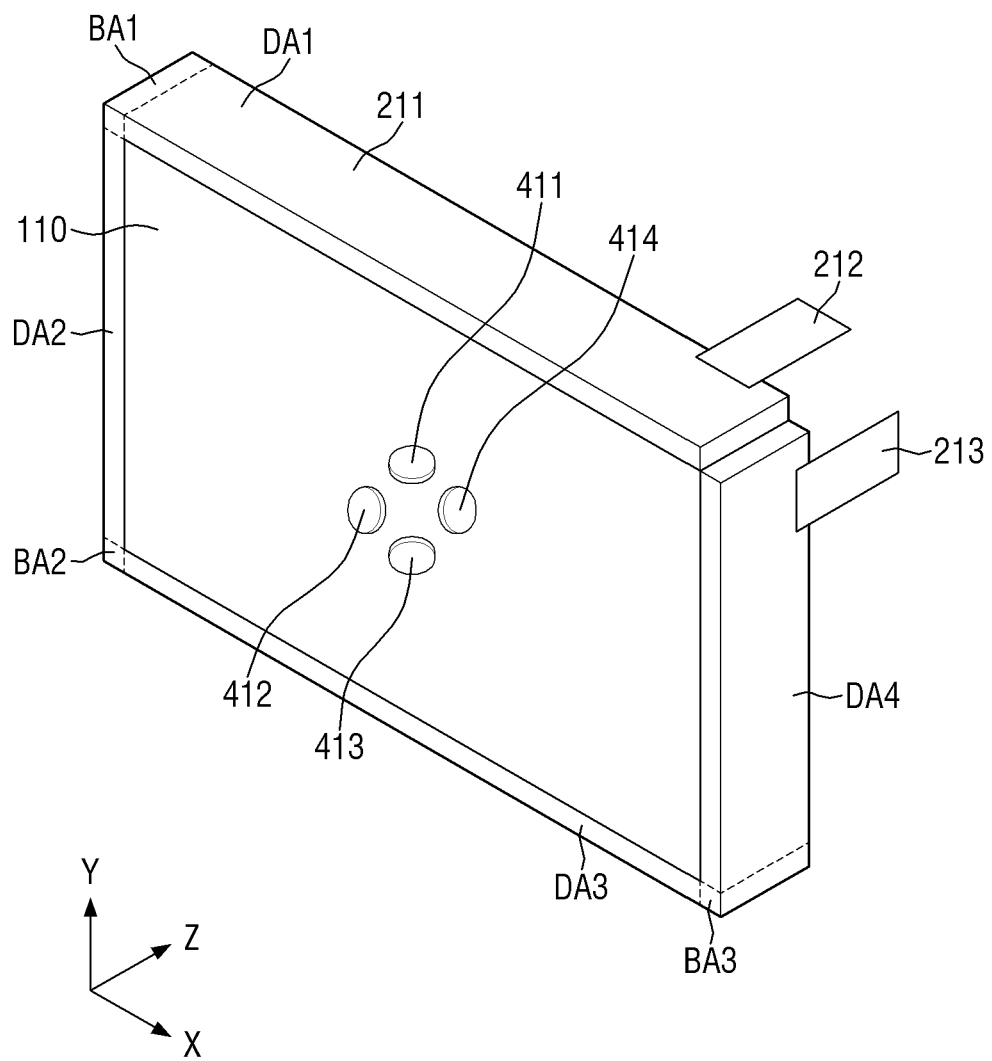
FIG. 3 is a perspective view of a first lens and a first display device of FIG. 2.
Figure 4A:
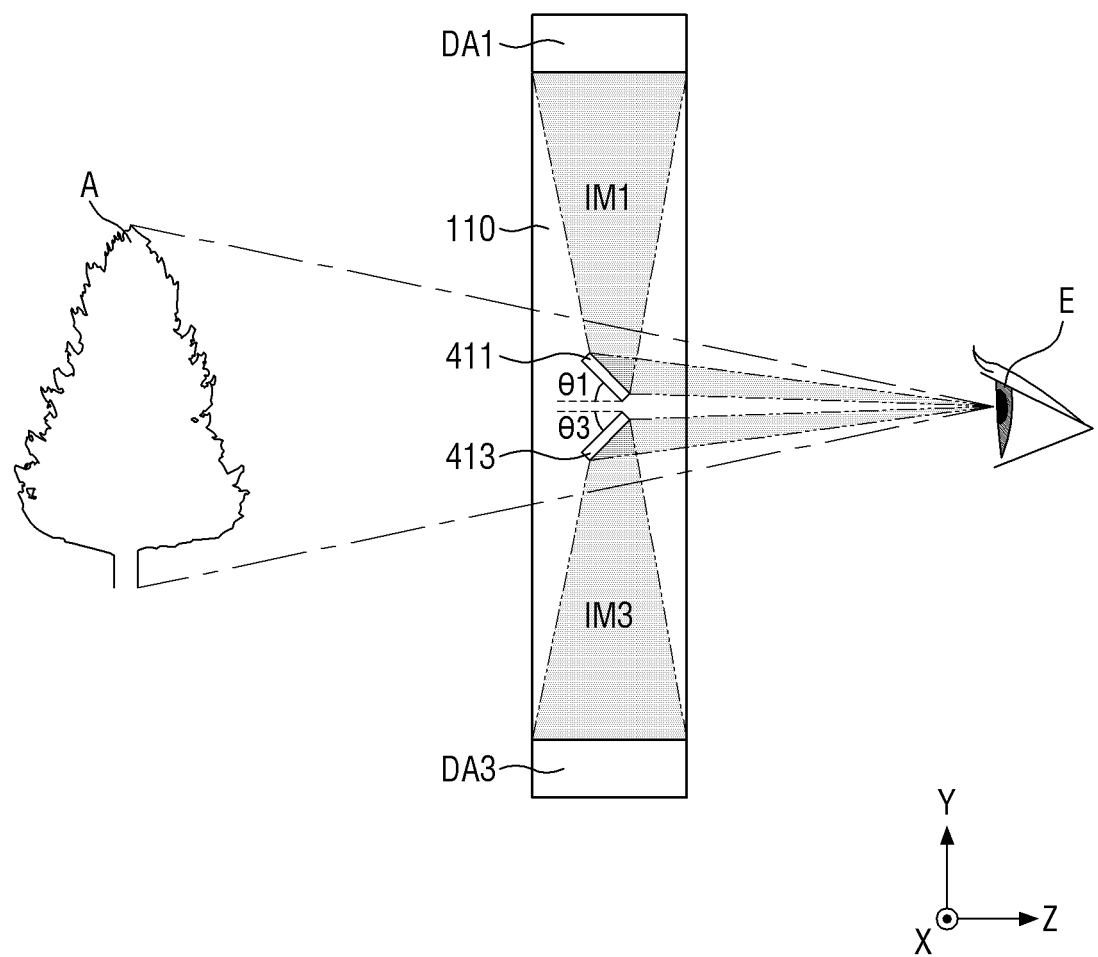
FIGS. 4A and 4B are side views illustrating how the first lens and the first display device of FIG. 2 implement an augmented reality.
Figure 4B:
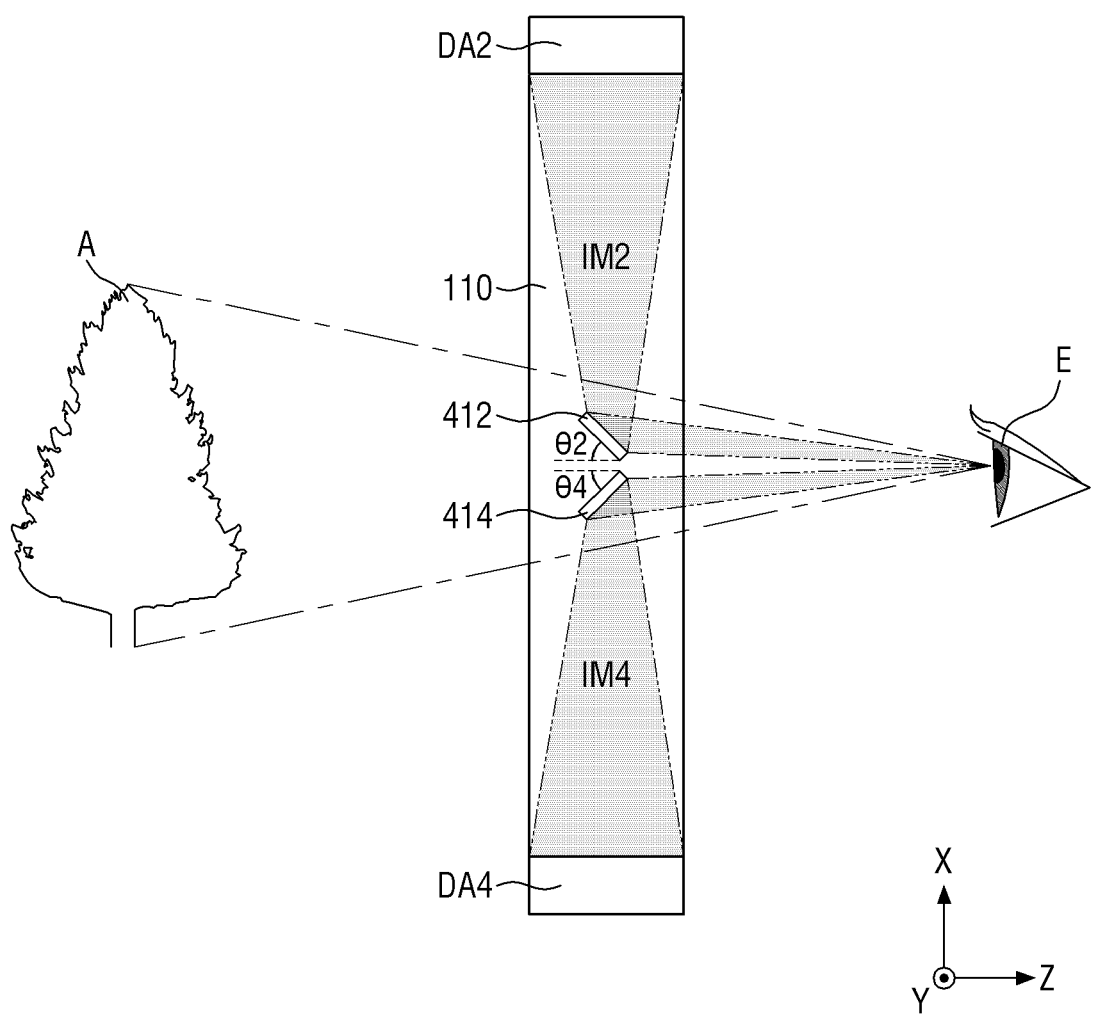

FIG. 3 is a perspective view illustrating the first lens and the first display device of FIG. 2. FIGS. 4A and 4B are side views illustrating how the first lens and the first display device of FIG. 2 implement an augmented reality.

Referring to FIGS. 3, 4A, and 4B, the first display panel 211 of the first display device 210 is disposed on multiple sides of the first lens 110. The first display panel 211 may include a first display area DA1 disposed on a first side of the first lens 110, a second display area DA2 disposed on a second side of the first lens 110, a third display area DA3 disposed on a third side of the first lens 110, and a fourth display area DA4 disposed on a fourth side of the first lens 110. The first, second, third, and fourth sides of the first lens 110 may be the upper, left, lower, and right sides, respectively, of the first lens 110.

Also, the first display panel 211 may include a first bending area BA1, which is bendable or foldable between the first and second display areas DA1 and DA2, a second bending area BA2, which is bendable or foldable between the second and third display areas DA2 and DA3, and a third bending area BA3, which is bendable or foldable between the third and fourth display areas DA3 and DA4. The first bending area BA1 can be bent at the boundary between the upper and left sides of the first lens 110. The second bending area BA2 can be bent at the boundary between the left and lower sides of the first lens 110. The third bending area BA3 can be bent at the boundary between the lower and right sides of the first lens 110.

The first and second display areas DA1 and DA2 may be connected by the first bending area BA1, the second and third display areas DA2 and DA3 may be connected by the second bending area BA2, and the third and fourth display areas DA3 and DA4 may be connected by the third bending area BA3. The first and fourth display areas DA1 and DA4 may not be connected, and be spaced apart from each other.

The first reflective member 411 may be inclined at a first angle $\theta1$, so as to reflect a first image IM1 from the first display area DA1 and provide the first image IM1 to the right eye RE of the user. The first reflective member 411 may be disposed nearest to the upper side of the first lens 110, where the first display area DA1 is disposed.

The second reflective member 412 may be inclined at a second angle $\theta2$, so as to reflect a second image IM2 from the second display area DA2 and provide the second image IM2 to the right eye RE of the user. The second reflective member 412 may be disposed nearest to the left side of the first lens 110, where the second display area DA2 is disposed.

The third reflective member 413 may be inclined at a third angle $\theta3$, so as to reflect a third image IM3 from the third display area DA3 and provide the third image IM3 to the right eye RE of the user. The third reflective member 413 may be disposed nearest to the lower side of the first lens 110, where the third display area DA3 is disposed.

The fourth reflective member 414 may be inclined at a fourth angle $\theta4$, so as to reflect a fourth image IM4 from the fourth display area DA4 and provide the fourth image IM4 to the right eye RE of the user. The fourth reflective member 414 may be disposed nearest to the right side of the first lens 110, where the fourth display area DA4 is disposed.

As illustrated in FIGS. 4A and 4B, the first, second, third, and fourth angles $\theta1$, $\theta2$, $\theta3$, and $\theta4$ refer to the angles that the first, second, third, and fourth reflective members 411, 412, 413, and 414 are inclined in the height direction of the first lens 110 (e.g., the Y-axis direction) with respect to the thickness direction of the first lens 110 (e.g., the Z-axis direction).

The first and third reflective members 411 and 413 may be disposed to be symmetrical with respect to the center of the first lens 110 in the height direction of the first lens 110 (e.g., the Y-axis direction). In this case, the first and third angles $\theta1$ and $\theta3$ may be substantially the same. Similarly, the second and fourth reflective members 412 and 414 may be disposed to be symmetrical with respect to the center of the second lens 120 in the width direction of the second lens 120 (e.g., the X-axis direction). In this case, the second and fourth angles $\theta2$ and $\theta4$ may be substantially the same.

The first image IM1, which is displayed in the first display area DA1 of the first display panel 211, may be reflected by the first reflective member 411, as illustrated in FIG. 4A. The first image IM1 reflected by the first reflective member 411 may be emitted through the first surface of the first lens 110, and may then be focused at one point on the retina of the right eye RE of the user. Also, the third image IM3, which is displayed in the third display area DA3 of the first display panel 211, may be reflected by the third reflective member 413, as illustrated in FIG. 4A. The third image IM3 reflected by the third reflective member 413 may be emitted through the first surface of the first lens 110, and may then be focused at one point on the retina of the right eye RE of the user. Accordingly, the user can view an object A, which is a real-world image, in addition to the first and third images IM1 and IM3, which are virtual images, without changing his or her focus on the object A.

The second image IM2, which is displayed in the second display area DA2 of the first display panel 211, may be reflected by the second reflective member 412, as illustrated in FIG. 4B. The second image IM2 reflected by the second reflective member 412 may be emitted through the first surface of the first lens 110, and may then be focused at one point on the retina of the right eye RE of the user. Also, the fourth image IM4, which is displayed in the fourth display area DA4 of the first display panel 211, may be reflected by the fourth reflective member 414, as illustrated in FIG. 4B. The fourth image IM4 reflected by the fourth reflective member 414 may be emitted through the first surface of the first lens 110, and may then be focused at one point on the retina of the right eye RE of the user. Accordingly, the user can view the object A, which is a real-world image, in addition to the second and fourth images IM2 and IM4, which are virtual images, without changing his or her focus on the object A.

The second display device 220 can be implemented in substantially the same manner as the first display device 210 described above with reference to FIGS. 3, 4A, and 4B, and thus, repeated descriptions thereof will be omitted to avoid redundancy.

Figure 5:
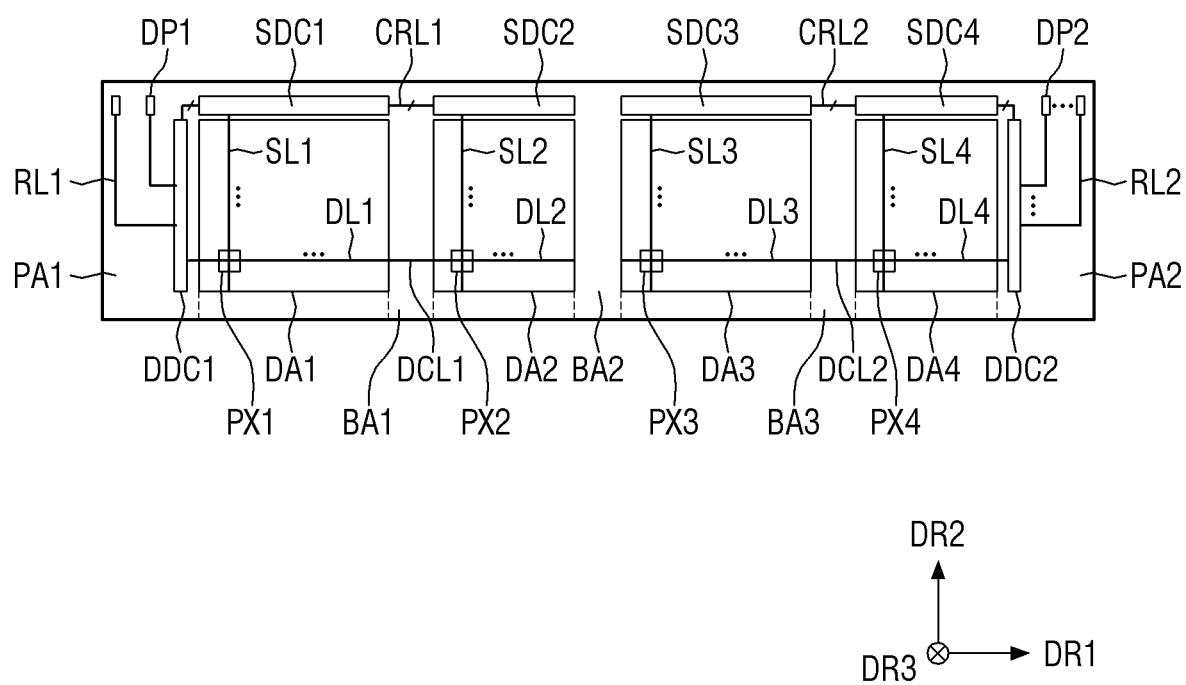
FIG. 5 is a development view of a first display device of FIG. 2, according to an exemplary embodiment.

FIG. 5 is a development view of a first display device of FIG. 2, according to an exemplary embodiment.

Referring to FIG. 5, a first display panel 211 of a first display device 210 may include a first display area DA1, a second display area DA2, a third display area DA3, a fourth display area DA4, a first bending area BA1, a second bending area BA2, a third bending area BA3, a first pad area PA1, and a second pad area PA2. The first display device 210 may include a first scan driving circuit unit SDC1, a second scan driving circuit unit SDC2, a third scan driving circuit unit SDC3, a fourth scan driving circuit unit SDC4, a first integrated driving circuit unit DDC1, and a second integrated driving circuit unit DDC2.

The first display area DA1 may include first data lines DL1, first scan lines SL1, and first pixels PX1. The first data lines DL1 may be arranged in a first direction DR1, and the first scan lines SL1 may be arranged in a second direction DR2 which intersects the first direction DR1. The first pixels PX1 may be arranged in regions that are defined by the first data lines DL1 and the first scan lines SL1. For example, the first pixels PX1 may be arranged at the intersections between the first data lines DL1 and the first scan lines SL1. The first pixels PX1 of the first display area DA1 will be described in more detail later with reference to FIG. 6.

The second display area DA2 may include second data lines DL2, second scan lines SL2, and second pixels PX2. The second data lines DL2 may be arranged in the first direction DR1, and the second scan lines SL2 may be arranged in the second direction DR2. The second pixels PX2 may be arranged in regions that are defined by the second data lines DL2 and the second scan lines SL2. For example, the second pixels PX2 may be arranged at the intersections between the second data lines DL2 and the second scan lines SL2.

The third display area DA3 may include third data lines DL3, third scan lines SL3, and third pixels PX3. The third data lines DL3 may be arranged in the first direction DR1, and the third scan lines SL3 may be arranged in the second direction DR2. The third pixels PX3 may be arranged in regions that are defined by the third data lines DL3 and the third scan lines SL3. For example, the third pixels PX3 may be arranged at the intersections between the third data lines DL3 and the third scan lines SL3.

The fourth display area DA4 may include fourth data lines DL4, fourth scan lines SL4, and fourth pixels PX4. The fourth data lines DL4 may be arranged in the first direction DR1, and the fourth scan lines SL4 may be arranged in the second direction DR2. The fourth pixels PX4 may be arranged in regions that are defined by the fourth data lines DL4 and the fourth scan lines SL4. For example, the fourth pixels PX4 may be arranged at the intersections between the fourth data lines DL4 and the fourth scan lines SL.

As illustrated in FIG. 3, the length in the width direction (or the X-axis direction) of the first lens 110 is greater than the length in the height direction (or the Y-axis direction) of the first lens 110. As such, the lengths in the first direction DR1, of the first and third display areas DA1 and DA3, which are disposed on the upper and lower sides, respectively, of the first lens 110 may be greater than the lengths in the first direction DR1, of the second and fourth display areas DA2 and DA4, which are disposed on the left and right sides, respectively, of the first lens 110. Also, as illustrated in FIG. 3, when the length in the thickness direction (or the Z-axis direction) of the first lens 110 is uniform on each sides of the first lens 110, the lengths in the second direction DR2 of the first, second, third, and fourth display areas DA1, DA2, DA3, and DA4 may be substantially the same as each other.

The first bending area BA1 may be disposed between the first and second display areas DA1 and DA2. The first bending area BA1 may include first data connecting lines DCL1, which connect the first data lines DL1 and the second data lines DL2. The first bending area BA1 may include first carry signal lines CRL1, which connect the first and second scan driving circuit units SDC1 and SDC2. No pixels may be formed in the first bending area BA1.

The second bending area BA2 may be disposed between the second and third display areas DA2 and DA3. No conductive lines and no pixels may be formed in the second bending area BA2.

The third bending area BA3 may be disposed between the third and fourth display areas DA3 and DA4. The third bending area BA3 may include second data connecting lines DCL2, which connect the third data lines DL3 and the fourth data lines DL4. The third bending area BA3 may include second carry signal lines CRL2, which connect the third and fourth scan driving circuit units SDC3 and SDC4. No pixels may be formed in the third bending area BA3.

The first display panel 211 may be formed to be thinner in the first, second, and third bending areas BA1, BA2, and BA3 than in the first, second, third, and fourth display areas DA1, DA2, DA3, and DA4 to reduce bending stress. For example, some of the inorganic and organic films formed in the first, second, third, and fourth display areas DA1, DA2, DA3, and DA4 may not be formed in the first, second, and third bending areas BA1, BA2, and BA3.

The first pad area PA1 includes first routing lines RL1, which are connected to the first integrated driving circuit unit DDC1, and first pads DP1, which are connected to the first routing lines RL1. The first pads DP1 may be electrically connected to the first circuit board 212. The first circuit board 212 may be attached on the first pads DP1 via an anisotropic conductive film, for example.

The second pad area PA2 includes second routing lines RL2, which are connected to the second scan driving circuit unit SDC2 and to the second integrated driving circuit unit DDC2, and second pads DP2, which are connected to the second routing lines RL2. The second pads DP2 may be electrically connected to the second circuit board 213. The second circuit board 213 may be attached on the second pads DP2 via an anisotropic conductive film, for example.

The first scan driving circuit unit SDC1 may be disposed on a first side of the first display area DA1. The first scan driving circuit unit SDC1 may be disposed adjacent to a long side of the first display area DA1. The first scan driving circuit unit SDC1 is connected to the first scan lines SL1 of the first display area DA1. The first scan driving circuit unit SDC1 may receive a first scan control signal from the first integrated driving circuit unit DDC1, may generate first scan signals in accordance with the first scan control signal, and may sequentially apply the first scan signals to the first scan lines SL1.

The second scan driving circuit unit SDC2 may be disposed on a first side of the second display area DA2. The second scan driving circuit unit SDC2 may be disposed adjacent to a long side of the second display area DA2. The second scan driving circuit unit SDC2 is connected to the second scan lines SL2 of the second display area DA2. The second scan driving circuit unit SDC2 may receive first carry signals from the first scan driving circuit unit SDC1 via the first carry signal lines CRL1, may generate second scan signals in accordance with the first carry signals, and may sequentially apply the second scan signals to the second scan lines SL2. The first scan driving circuit unit SDC1 may output the last scan signal output from the first scan driving circuit unit SDC1 as a carry signal.

The third scan driving circuit unit SDC3 may be disposed on a first side of the third display area DA3. The third scan driving circuit unit SDC3 may be disposed adjacent to a long side of the third display area DA3. The third scan driving circuit unit SDC3 is connected to the first scan lines SL1 of the first display area DA1. The third scan driving circuit unit SDC3 may receive second carry signals from the fourth scan driving circuit unit SDC4 via the second carry signal lines CRL2, may generate third scan signals in accordance with the second carry signals, and may sequentially apply the third scan signals to the third scan lines SL3. The third scan driving circuit unit SDC3 may output the last scan signal output from the fourth scan driving circuit unit SDC4 as a carry signal.

The fourth scan driving circuit unit SDC4 may be disposed on a first side of the fourth display area DA4. The fourth scan driving circuit unit SDC4 may be disposed adjacent to a long side of the fourth display area DA4. The fourth scan driving circuit unit SDC4 is connected to the fourth scan lines SL4 of the fourth display area DA4. The fourth scan driving circuit unit SDC4 may receive a second scan control signal from the second integrated driving circuit unit DDC2, may generate fourth scan signals in accordance with the second scan control signal, and may sequentially apply the fourth scan signals to the fourth scan lines SL4.

Each of the first, second, third, and fourth scan driving circuit units SDC1, SDC2, SDC3, and SDC4 may include thin-film transistors (TFTs) as switching elements. In this case, the TFTs of each of the first, second, third, and fourth scan driving circuit units SDC1, SDC2, SDC3, and SDC4 may be formed together with the TFTs of the first pixels PX1 of the first display area DA1, the TFTs of the second pixels PX2 of the second display area DA2, the TFTs of the third pixels PX3 of the third display area DA3, and the TFTs of the fourth pixels PX4 of the fourth display area DA4.

The first integrated driving circuit unit DDC1 may be disposed on a second side of the first display area DA1. The first integrated driving circuit unit DDC1 may be disposed adjacent to a short side of the first display area DA1. The first integrated driving circuit unit DDC1 may be disposed between the first display area DA1 and the first pad area PA1.

The first integrated driving circuit unit DDC1 receives first timing signals, first video data, and second video data via the first routing lines RL1. The first integrated driving circuit unit DDC1 may generate the first scan control signal from the first timing signals and may output the first scan control signal to the first scan driving circuit unit SDC1. The first integrated driving circuit unit DDC1 may generate a first data control signal from the first timing signals. The first integrated driving circuit unit DDC1 may generate first data voltages in accordance with the first data control signal and the first video data, while the first scan signals are being applied, and may apply the first data voltages to the first data lines DL1, the first data connecting lines DCL1, and the second data lines DL2. The first integrated driving circuit unit DDC1 may generate second data voltages in accordance with the first data control signal and the second video data, while the second scan signals are being applied, and may apply the second data voltages to the first data lines DL1, the first data connecting lines DCL1, and the second data lines DL2.

The second integrated driving circuit unit DDC2 may be disposed on a second side of the fourth display area DA4. The second integrated driving circuit unit DDC2 may be disposed adjacent to a short side of the fourth display area DA4. The second integrated driving circuit unit DDC2 may be disposed between the fourth display area DA4 and the second pad area PA2.

The second integrated driving circuit unit DDC2 receives second timing signals, third video data, and fourth video data via the second routing lines RL2. The second integrated driving circuit unit DDC2 may generate the second scan control signal from the second timing signals and may output the second scan control signal to the second scan driving circuit unit SDC2. The second integrated driving circuit unit DDC2 may generate a second data control signal from the second timing signals. The second integrated driving circuit unit DDC2 may generate fourth data voltages in accordance with the second data control signal and the fourth video data, while the fourth scan signals are being applied, and may apply the fourth data voltages to the third data lines DL3, the second data connecting lines DCL2, and the fourth data lines DL4. The second integrated driving circuit unit DDC2 may generate third data voltages in accordance with the second data control signal and the third video data, while the third scan signals are being applied, and may apply the third data voltages to the third data lines DL3, the second data connecting lines DCL2, and the fourth data lines DL4.

The first and second integrated driving circuit units DDC1 and DDC2 may be formed as integrated circuits (ICs).

In some exemplary embodiments, one of the first and second integrated driving circuit units DDC1 and DDC2 may be omitted. In this case, the second data lines DL2 of the second display area DA2 and the third data liens DL3 of the third display area DA3 may be connected via third data connecting lines. The first pixels PX1 of the first display area DA1, the second pixels PX2 of the second display area DA2, the third pixels PX3 of the third display area DA3, and the fourth pixels PX4 of the fourth display area DA4 may receive data voltages from one of the first and second integrated driving circuit units DDC1 and DDC2.

According to the illustrated exemplary embodiment shown in FIG. 5, since the first display device 210 includes multiple bending areas that can be bent, i.e., the first, second, and third bending areas BA1, BA2, and BA3, the first display device 210 can be easily bent along the boundaries between the upper and left sides of the first lens 110, between the left and lower sides of the first lens 110, and between the lower and right sides of the first lens 110.

Also, according to the illustrated exemplary embodiment of FIG. 5, the first pixels PX1 of the first display area DA1 and the second pixels PX2 of the second display area DA2 may receive data voltages from a single integrated driving circuit unit, e.g., the first integrated driving circuit unit DDC1, and the third pixels PX3 of the third display area DA3 and the fourth pixels PX4 of the fourth display area DA4 may receive data voltages from a single integrated driving circuit unit, e.g., the second integrated driving circuit unit DDC2.

The second display device 220 can be implemented in substantially the same manner as the first display device 210 described above with reference to FIG. 5, and thus, repeated descriptions thereof will be omitted.

FIG. 6 is a cross-sectional view of the first display area and the first bending area of the first display panel of FIG. 5.

Referring to FIG. 6, the first display area DA1 of the first display device 210 may include a substrate 1100, a TFT layer 1230, a light-emitting element layer 1240, and a thin-film encapsulation layer 1300.

The TFT layer 1230 is formed on the substrate 1100. The TFT layer 1230 includes TFTs 1235, a gate insulating film 1236, an interlayer insulating film 1237, a passivation film 1238, and a planarization film 1239.

A buffer film may be formed on the substrate 1100. The buffer film may be formed on the substrate 1100 to protect the TFTs 1235 and light-emitting elements against moisture penetrating the substrate 1100, which is susceptible to moisture. The buffer film may include a plurality of inorganic films that are alternately stacked. For example, the buffer film may be formed as a multilayer film, in which a silicon oxide ($SiO_x$) film, a silicon nitride ($SiN_x$) film, and/or a silicon oxynitride (SiON) film are alternately stacked. In some exemplary embodiments, the buffer film may be omitted.

The TFTs 1235 are formed on the buffer film. Each of the TFTs 1235 includes an active layer 1231, a gate electrode 1232, a source electrode 1233, and a drain electrode 1234. FIG. 4 illustrates each of the TFTs 1235 as having a top gate structure, in which the gate electrode 1232 is disposed above the active layer 1231, but the inventive concepts are not limited thereto. For example, in some exemplary embodiments, the TFTs 1235 may have a bottom gate structure, in which the gate electrode 1232 is disposed below the active layer 1231 or a double gate structure, in which the gate electrode 1232 is disposed both above and below the active layer 1231.

The active layer 1231 is formed on the buffer film. The active layer 1231 may be formed of a silicon-based semiconductor material or an oxide-based semiconductor material. In some exemplary embodiments, a light-shielding layer for blocking external light incident on the active layer 1231 may be formed between the buffer film and the active layer 1231.

A gate insulating film 1236 may be formed on the active layer 1231. The gate insulating film 1236 may be formed as an inorganic film, such as, for example, a silicon oxide film, a silicon nitride film, or a multilayer film thereof.

The gate electrode 1232 and a gate line may be formed on the gate insulating film 1236. The gate electrode 1232 and the gate line may be formed as single- or multilayer films using molybdenum (Mo), aluminum (Al), chromium (Cr), gold (Au), titanium (Ti), nickel (Ni), neodymium (Nd), copper (Cu), or an alloy thereof.

The interlayer insulating film 1237 may be formed on the gate electrode 1232 and the gate line. The interlayer insulating film 1237 may be formed as an inorganic film such as, for example, a silicon oxide film, a silicon nitride film, or a multilayer film thereof.

The source electrode 1233, the drain electrode 1234, and a data line may be formed on the interlayer insulating film 1237. The source electrode 1233 and the drain electrode 1234 may be connected to the active layer 1231 through contact holes penetrating the gate insulating film 1236 and the interlayer insulating film 1237. The source electrode 1233, the drain electrode 1234, and the data line may be formed as single- or multilayer films using Mo, Al, Cr, Au, Ti, Ni, Nd, Cu, or an alloy thereof.

The passivation film 1238 may be formed on the source electrode 1233, the drain electrode 1234, and the data line to insulate the TFTs 1235. The passivation film 1238 may be formed as an inorganic film, such as, for example, a silicon oxide film, a silicon nitride film, or a multilayer film thereof.

The planarization film 1239 may be formed on the passivation film 1238 to planarize height differences formed by the TFTs 1235. The planarization film 1239 may be formed as an organic film using an acrylic resin, an epoxy resin, a phenolic resin, a polyamide resin, or a polyimide resin.

The light-emitting element layer 1240 is formed on the TFT layer 1230. The light-emitting element layer 1240 includes light-emitting elements and a pixel-defining film 1244.

The light-emitting elements and the pixel-defining film 1244 are formed on the planarization film 1239. The light-emitting elements may be OLEDs. In this case, each of the light-emitting elements may include an anode electrode 1241, a light-emitting layer 1242, and a cathode electrode 1243.

The anode electrode 1241 may be formed on the planarization film 1239. The anode electrode 1241 may be connected to the source electrode 1233 through a contact hole penetrating the passivation film 1238 and the planarization film 1239.

The pixel-defining film 1244 may be formed to cover the edges of the anode electrode 1241 to define the first pixels PX1. Each of the first pixels PX1 may be a region, in which the anode electrode 1241, the light-emitting layer 1242, and the cathode electrode 1243 are sequentially stacked. As such, holes from the anode electrode 1241 and electrons from the cathode electrode 1243 are combined in the light-emitting layer 1242 to emit light.

The light-emitting layer 1242 may be formed on the anode electrode 1241 and the pixel-defining film 1244. The light-emitting layer 1242 may emit one of red light, green light, and blue light. The red light may have a peak wavelength range of about 620 nm to about 750 nm, the green light may have a peak wavelength range of about 495 nm to about 570 nm, and the blue light may have a peak wavelength range of about 450 nm to about 495 nm. Alternatively, the light-emitting layer 1242 may be a white light-emitting layer emitting white light. In this case, the light-emitting layer 1242 may have a stack of red, green, and blue light-emitting layers, and may be a common layer formed in common for each of the first pixels PX1, and the first display device 210 may further include color filters for displaying red, green, and blue colors.

The light-emitting layer 1242 may include a hole transport layer, an emission layer, and an electron transport layer. The light-emitting layer 1242 may have a tandem structure with two or more stacks, in which case, a charge generating layer may be formed between the stacks.

The cathode electrode 1243 may be formed on the light-emitting layer 1242. The cathode electrode 1243 may be formed to cover the light-emitting layer 1242. The cathode electrode 1243 may be a common layer formed in common for each of the first pixels PX1.

When the light-emitting element layer 1240 is formed as a top emission-type light-emitting element layer 1240 that emits light in a direction toward the second substrate 112, e.g., in an upper direction, the anode electrode 1241 may be formed of a metal material with high reflectance, such as a stack of Al and Ti (e.g., Ti/Al/Ti), a stack of Al and indium tin oxide (ITO) (e.g., ITO/Al/ITO), a silver (Ag)-palladium (Pd)-copper (Cu) (APC) alloy, or a stack of an APC alloy and ITO (e.g., ITO/APC/ITO), and the cathode electrode 1243 may be formed of a transparent conductive oxide (TCO) material, such as ITO or indium zinc oxide (IZO) that can transmit light therethrough or a semi-transmissive conductive material, such as magnesium (Mg), Ag, or an alloy thereof. When the cathode electrode 1243 is formed of a semi-transmissive conductive material, the emission efficiency of the light-emitting element layer 1240 may be improved due to a micro-cavity effect.

When the light-emitting element layer 1240 is formed as a bottom emission-type light-emitting element layer that emits light in a downward direction, the anode electrode 1241 may be formed of a TCO material, such as ITO or IZO, or a semi-transparent conductive material, such as Mg, Ag, or an alloy thereof, and the cathode electrode 1243 may be formed of a metal material with high reflectance, such as a stack of Al and Ti (e.g., Ti/Al/Ti), a stack of Al and ITO (e.g., ITO/Al/ITO), an APC alloy, or a stack of an APC alloy and ITO (e.g., ITO/APC/ITO). When the anode electrode 1241 is formed of a semi-transparent conductive material, the emission efficiency of the light-emitting element layer 1240 may be improved due to a micro-cavity effect.

The thin-film encapsulation layer 1300 is formed on the light-emitting element layer 1240. The thin-film encapsulation layer 1300 prevents oxygen or moisture from infiltrating into the light-emitting layer 1242 and the cathode electrode 1243. To this end, the thin-film encapsulation layer 1300 may include at least one inorganic film. The inorganic film may be formed of silicon nitride, aluminum nitride, zirconium nitride, titanium nitride, hafnium nitride, tantalum nitride, silicon oxide, aluminum oxide, or titanium oxide. The thin-film encapsulation layer 1300 may further include at least one organic film. The organic film may have a sufficient thickness to prevent foreign particles from entering the light-emitting layer 1242 and the cathode electrode 1243 through the thin-film encapsulation layer 1300. The organic film may include one of epoxy, acrylate, and urethane acrylate. In some exemplary embodiments, an encapsulation substrate may be disposed on the light-emitting element layer 1240, instead of the thin-film encapsulation layer 1300.

The second, third, and fourth display areas DA2, DA3, and DA4 of the first display device 210 can be implemented in substantially the same manner as the first display area DA1 described above with reference to FIG. 6, and thus, repeated descriptions thereof will be omitted.

In some exemplary embodiments all or at least one of the planarization film 1239, the pixel-defining film 1244, and the thin-film encapsulation layer 1300 shown in FIG. 6 may be removed from the first, second, and third bending areas BA1, BA2, and BA3 of the first display device 210 to reduce bending stress.

The second display device 220 can be implemented in substantially the same manner as the display device 210 described above with reference to FIG. 6, and thus, repeated descriptions thereof will be omitted.

Figure 7:
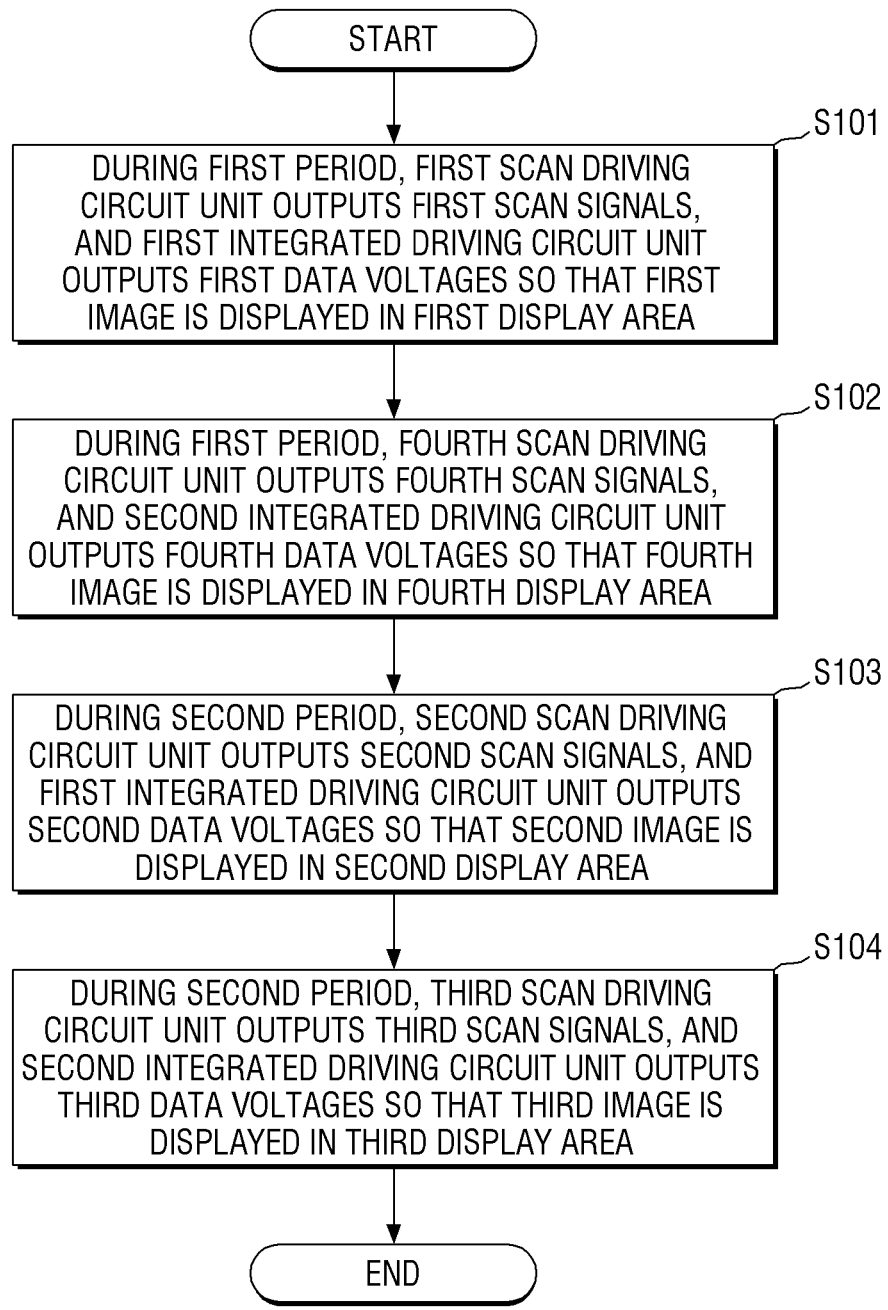
FIG. 7 is a flowchart exemplarily illustrating a driving method of the first display device of FIG. 5.

FIG. 7 is a flowchart exemplarily illustrating a driving method of the first display device of FIG. 5.

Referring to FIG. 7, in S101, during a first period, the first scan driving circuit unit SDC1 sequentially applies the first scan signals to the first scan lines SL1, and the first integrated driving circuit unit DDC1 applies the first data voltages to the first data lines DL1, the first data connecting lines DCL1, and the second data lines DL2. Accordingly, the first pixels PX1 of the first display area DA1 can display the first image IM1 in accordance with the first data voltages. The first image IM1 in the first display area DA1 may be reflected by the first reflective member 411 to be provided to the right eye RE of the user.

In S102, during the first period, the fourth scan driving circuit unit SDC4 sequentially applies the fourth scan signals to the fourth scan lines SL4, and the second integrated driving circuit unit DDC2 applies the fourth data voltages to the third data lines DL3, the second data connecting lines DCL2, and the fourth data lines DL4. Accordingly, the fourth pixels PX4 of the fourth display area DA4 can display the fourth image IM4 in accordance with the fourth data voltages. The fourth image IM4 in the fourth display area DA4 may be reflected by the fourth reflective member 414 to be provided to the right eye RE of the user.

In S103, during a second period, the second scan driving circuit unit SDC2 sequentially applies the second scan signals to the second scan lines SL2, and the first integrated driving circuit unit DDC1 applies the second data voltages to the first data lines DL1, the first data connecting lines DCL1, and the second data lines DL2. Accordingly, the second pixels PX2 of the second display area DA2 can display the second image IM2 in accordance with the second data voltages. The second image IM2 in the second display area DA2 may be reflected by the second reflective member 412 to be provided to the right eye RE of the user.

In S104, during the second period, the third scan driving circuit unit SDC3 sequentially applies the third scan signals to the third scan lines SL3, and the second integrated driving circuit unit DDC2 applies the third data voltages to the third data lines DL3, the second data connecting lines DCL2, and the fourth data lines DL4. Accordingly, the third pixels PX3 of the third display area DA3 can display the third image IM3 in accordance with the third data voltages. The third image IM3 in the third display area DA3 may be reflected by the third reflective member 413 to be provided to the right eye RE of the user.

According to the illustrated exemplary embodiment of FIG. 7, the first, second, third, and fourth images IM1, IM2, IM3, and IM4 of the first, second, third, and fourth display areas DA1, DA2, DA3, and DA4 can be provided to the right eye RE of the user. In this manner, since the user can view four virtual images together with a real-world image, the area of the first display device 210 actually being viewed by the user, i.e., the FOV of the user, can be widened.

A driving method of the second display device 220 is substantially the same as that described above with reference to FIG. 7, and thus, repeated descriptions thereof will be omitted.

FIG. 8 is a development view of a first display device of FIG. 2 according to another exemplary embodiment.

The first display device according to the illustrated exemplary embodiment of FIG. 8 differs from that of FIG. 5, in that a third integrated driving circuit unit DDC3 is disposed in a first bending area BA1, and that a fourth integrated driving circuit unit DDC4 is disposed in a third bending area BA3. The first display device according to the illustrated embodiment of FIG. 8 will hereinafter be described, focusing mainly on the differences with that of FIG. 5.

Referring to FIG. 8, in the first bending area BA1, first data connecting lines DCL1 are formed, which connect first data lines DL1 and second data lines DL2. In the third bending area BA3, second data connecting lines DCL2 are formed, which connect third data lines DL3 and fourth data lines DL4.

In the first bending area BA1, the third integrated driving circuit unit DDC3 may be disposed adjacent to a second display area DA2. The third integrated driving circuit unit DDC3 may extend in a second direction DR2. The third integrated driving circuit unit DDC3 receives a third data control signal and second video data via first routing lines RL1. The third integrated driving circuit unit DDC3 may generate second data voltages in accordance with the third data control signal and the second video data, while second scan signals are being applied, and may apply the second data voltages to the second data lines DL2.

In the third bending area BA3, the fourth integrated driving circuit unit DDC4 may be disposed adjacent to a third display area DA3. The fourth integrated driving circuit unit DDC4 may extend in the second direction DR2. The fourth integrated driving circuit unit DDC4 receives a fourth data control signal and third video data via second routing lines RL2. The fourth integrated driving circuit unit DDC4 may generate third data voltages in accordance with the fourth data control signal and the third video data, while third scan signals are being applied, and may apply the third data voltages to the third data lines DL3.

The third and fourth integrated driving circuit units DDC3 and DDC4 may be formed as ICs.

According to the illustrated exemplary embodiment of FIG. 8, since the transmission length of the second data voltages can be reduced, as compared to a case where the first integrated driving circuit unit DDC1 applies the second data voltages to the first data lines DL1, the first data connecting lines DCL1, and the second data lines DL2, as illustrated in FIG. 5, the influence of wiring resistance on the second data voltages can be reduced. Also, since the transmission length of the third data voltages can be reduced, as compared to a case where the second integrated driving circuit unit DDC2 applies the third data voltages to the third data lines DL3, the second data connecting lines DCL2, and the fourth data lines DL2, the influence of wiring resistance on the third data voltages can be reduced.

The second display device 220 can be implemented in substantially the same manner as the display device 210 described above with reference to FIG. 8, and thus, repeated descriptions thereof will be omitted.

Figure 9:
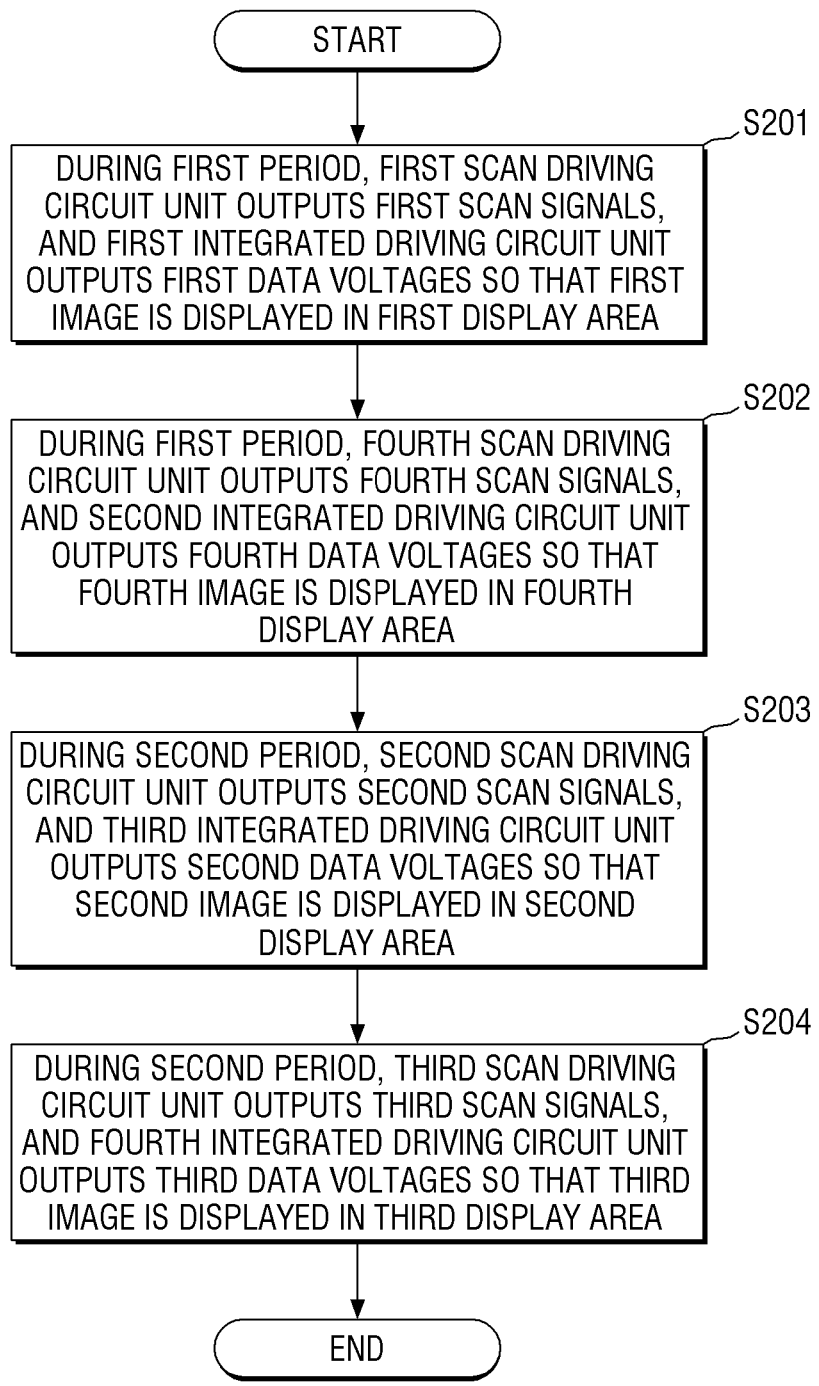
FIG. 9 is a flowchart illustrating another exemplary driving method of the first display device of FIG. 5.

FIG. 9 is a flowchart exemplarily illustrating a driving method of the first display device of FIG. 5 according to another exemplary embodiment.

Referring to FIG. 9, in S201, during a first period, the first scan driving circuit unit SDC1 sequentially applies the first scan signals to the first scan lines SL1, and the first integrated driving circuit unit DDC1 applies the first data voltages to the first data lines DL1. Accordingly, the first pixels PX1 of the first display area DA1 can display the first image IM1 in accordance with the first data voltages. The first image IM1 in the first display area DA1 may be reflected by the first reflective member 411 to be provided to the right eye RE of the user.

In S202, during the first period, the fourth scan driving circuit unit SDC4 sequentially applies the fourth scan signals to the fourth scan lines SL4, and the second integrated driving circuit unit DDC2 applies the fourth data voltages to the fourth data lines DL4. Accordingly, the fourth pixels PX4 of the fourth display area DA4 can display the fourth image IM4 in accordance with the fourth data voltages. The fourth image IM4 in the fourth display area DA4 may be reflected by the fourth reflective member 414 to be provided to the right eye RE of the user.

In S203, during a second period, the second scan driving circuit unit SDC2 sequentially applies the second scan signals to the second scan lines SL2, and the third integrated driving circuit unit DDC3 applies the second data voltages to the second data lines DL2. Accordingly, the second pixels PX2 of the second display area DA2 can display the second image IM2 in accordance with the second data voltages. The second image IM2 in the second display area DA2 may be reflected by the second reflective member 412 to be provided to the right eye RE of the user.

In S204, during the second period, the third scan driving circuit unit SDC3 sequentially applies the third scan signals to the third scan lines SL3, and the fourth integrated driving circuit unit DDC4 applies the third data voltages to the third data lines DL3. Accordingly, the third pixels PX3 of the third display area DA3 can display the third image IM3 in accordance with the third data voltages. The third image IM3 in the third display area DA3 may be reflected by the third reflective member 413 to be provided to the right eye RE of the user.

According to the illustrated exemplary embodiment of FIG. 9, the first, second, third, and fourth images IM1, IM2, IM3, and IM4 of the first, second, third, and fourth display areas DA1, DA2, DA3, and DA4 can be provided to the right eye RE of the user. In this manner, since the user can view four virtual images together with a real-world image, the area of the first display device 210 actually being viewed by the user, i.e., the FOV of the user, can be widened.

The driving method of the second display device 220 is substantially the same as that described above with reference to FIG. 9, and thus, repeated descriptions thereof will be omitted.

FIG. 10 is a development view of a first display device of FIG. 2 according to another exemplary embodiment.

The first display device according to the illustrated exemplary embodiment of FIG. 10 differs from that of FIG. 5, in that a first integrated driving circuit unit DDC1 is disposed on a first side of a first display area DA1, that a second integrated driving circuit unit DDC2 is disposed on a first side of a second display area DA2, that a third integrated driving circuit unit DDC3 is disposed on a first side of a third display area DA3, that a fourth integrated driving circuit unit DDC4 is disposed on a first side of a fourth display area DA1, that a first scan driving circuit unit SDC1 is disposed on a second side of the first display area DA1, and that a second scan driving circuit unit SDC2 is disposed on a second side of the fourth display area DA4. The first display device according to the illustrated exemplary embodiment of FIG. 10 will hereinafter be described, focusing mainly on the differences with that of FIG. 5.

Referring to FIG. 10, the first scan driving circuit unit SDC1 may be disposed on the second side of the first display area DA1. The first scan driving circuit unit SDC1 may be disposed adjacent to a short side of the first display area DA1. The first scan driving circuit unit SDC1 may be connected to first scan lines SL1 of the first display area DA1, second scan lines SL2 of the second display area DA2, and first scan connecting lines SCL1, which connect the first scan lines SL1 and the second scan lines SL2. The first scan driving circuit unit SDC1 may receive a first scan control signal from the first integrated driving circuit unit DDC1, may generate first scan signals in accordance with the first scan control signal, and may sequentially apply the first scan signals to the first scan lines SL1, the first scan connecting lines SCL1, and the second scan lines SL2.

The second scan driving circuit unit SDC2 may be disposed on the second side of the fourth display area DA4. The second scan driving circuit unit SDC2 may be disposed adjacent to a short side of the fourth display area DA4. The second scan driving circuit unit SDC2 may be connected to third scan lines SL3 of the third display area DA3, fourth scan lines SL4 of the fourth display area DA4, and second scan connecting lines SCL2, which connect the third scan lines SL3 and the fourth scan lines SL4. The second scan driving circuit unit SDC2 may receive a second scan control signal from the second integrated driving circuit unit DDC2, may generate second scan signals in accordance with the second scan control signal, and may sequentially apply the second scan signals to the third scan lines SL1, the second scan connecting lines SCL2, and the fourth scan lines SL4.

The first integrated driving circuit unit DDC1 may be disposed on the first side of the first display area DA1. The first integrated driving circuit unit DDC1 may be disposed adjacent to a long side of the first display area DA1. The first integrated driving circuit unit DDC1 receives first timing signals and first video data via routing lines connected to first pads DP1. The first integrated driving circuit unit DDC1 may generate the first scan control signal from the first timing signals and may output the first scan control signal to the first scan driving circuit unit SDC1. The first integrated driving circuit unit DDC1 may generate the first data control signal from the first timing signals. The first integrated driving circuit unit DDC1 may generate the first data voltages in accordance with the first data control signal and the first video data, while the first scan signals are being applied, and may apply the first data voltages to first data lines DL1.

The second integrated driving circuit unit DDC2 may be disposed on the first side of the second display area DA2. The second integrated driving circuit unit DDC2 may be disposed adjacent to a long side of the second display area DA2. The second integrated driving circuit unit DDC2 receives the first timing signals and the second video data via the routing lines connected to the first pads DP1. The second integrated driving circuit unit DDC2 may generate the second data control signal from the first timing signals. The second integrated driving circuit unit DDC2 may generate the second data voltages in accordance with the second data control signal and the second video data, while the first scan signals are being applied, and may apply the second data voltages to second data lines DL2.

The third integrated driving circuit unit DDC3 may be disposed on the first side of the third display area DA3. The third integrated driving circuit unit DDC3 may be disposed adjacent to a long side of the third display area DA3. The third integrated driving circuit unit DDC3 receives the second timing signals and the third video data via routing lines connected to second pads DP2. The third integrated driving circuit unit DDC3 may generate the third data control signal from the second timing signals. The third integrated driving circuit unit DDC3 may generate the third data voltages in accordance with the third data control signal and the third video data, while the second scan signals are being applied, and may apply the third data voltages to third data lines DL3.

The fourth integrated driving circuit unit DDC4 may be disposed on the first side of the fourth display area DA4. The fourth integrated driving circuit unit DDC4 may be disposed adjacent to a long side of the fourth display area DA4. The fourth integrated driving circuit unit DDC4 receives the second timing signals and the fourth video data via the routing lines connected to the second pads DP2. The fourth integrated driving circuit unit DDC4 may generate the second scan control signal from the second timing signals and may output the second scan control signal to the second scan driving circuit unit SDC2. The fourth integrated driving circuit unit DDC4 may generate the fourth data control signal from the second timing signals. The fourth integrated driving circuit unit DDC4 may generate the fourth data voltages in accordance with the fourth data control signal and the fourth video data, while the second scan signals are being applied, and may apply the fourth data voltages to fourth data lines DL4.

The first scan driving circuit unit SDC1 sequentially applies the first scan signals to the first scan lines SL1, the first integrated driving circuit unit DDC1 applies the first data voltages to the first data lines DL1, and the second integrated driving circuit unit DDC2 applies the second data voltages to the second data lines DL2. Accordingly, first pixels PX1 of the first display area DA1 can display a first image in accordance with the first data voltages, and second pixels PX2 of the second display area DA2 can display a second image in accordance with the second data voltages. The first image in the first display area DA1 may be reflected by the first reflective member 411 to be provided to the right eye RE of the user, and the second image in the second display area DA2 may be reflected by the second reflective member 412 to be provided to the right eye RE of the user.

The second scan driving circuit unit SDC2 sequentially applies the second scan signals to the second scan lines SL2, the third integrated driving circuit unit DDC3 applies the third data voltages to the third data lines DL1, and the fourth integrated driving circuit unit DDC4 applies the fourth data voltages to the fourth data lines DL4. Accordingly, third pixels PX3 of the third display area DA3 can display a third image in accordance with the third data voltages, and fourth pixels PX4 of the fourth display area DA4 can display a fourth image in accordance with the fourth data voltages. The third image in the third display area DA3 may be reflected by the third reflective member 413 to be provided to the right eye RE of the user, and the fourth image in the fourth display area DA4 may be reflected by the fourth reflective member 414 to be provided to the right eye RE of the user.

According to the illustrated exemplary embodiment of FIG. 10, since the transmission length of the second data voltages can be reduced, as compared to a case where the first integrated driving circuit unit DDC1 applies the second data voltages to the first data lines DL1, first data connecting lines DCL1, and the second data lines DL2, as illustrated in FIG. 5, the influence of wiring resistance on the second data voltages can be reduced. Also, since the transmission length of the third data voltages can be reduced, as compared to a case where the second integrated driving circuit unit DDC2 applies the third data voltages to the third data lines DL3, second data connecting lines DCL2, and the fourth data lines DL4, as illustrated in FIG. 5, the influence of wiring resistance on the third data voltages can be reduced.

Also, scan driving circuit units may be additionally disposed in first and third bending areas BA1 and BA3. In this case, the first scan connecting lines SCL1 may not be formed in the first bending area BA1, and the second scan connecting lines SCL2 may not be formed in the third bending area BA3. The scan driving circuit unit disposed in the first bending area BA1 may be connected to the second scan lines SL2, and the scan driving circuit unit disposed in the third bending area BA3 may be connected to the third scan lines SL3. In this case, the first scan driving circuit unit SDC1 may output the first scan signals to the first scan lines, SL1, the second scan driving circuit unit SDC2 may output the second scan signals to the second scan lines SL2, the third scan driving circuit unit SDC3 may output the third scan signals to the third scan lines SL3, and the fourth scan driving circuit unit SDC4 may output the fourth scan signals to the fourth scan lines SL4.

The second display device 220 can be implemented in substantially the same manner as the display device 210 described above with reference to FIG. 10, and thus, repeated descriptions thereof will be omitted.

Figure 11:
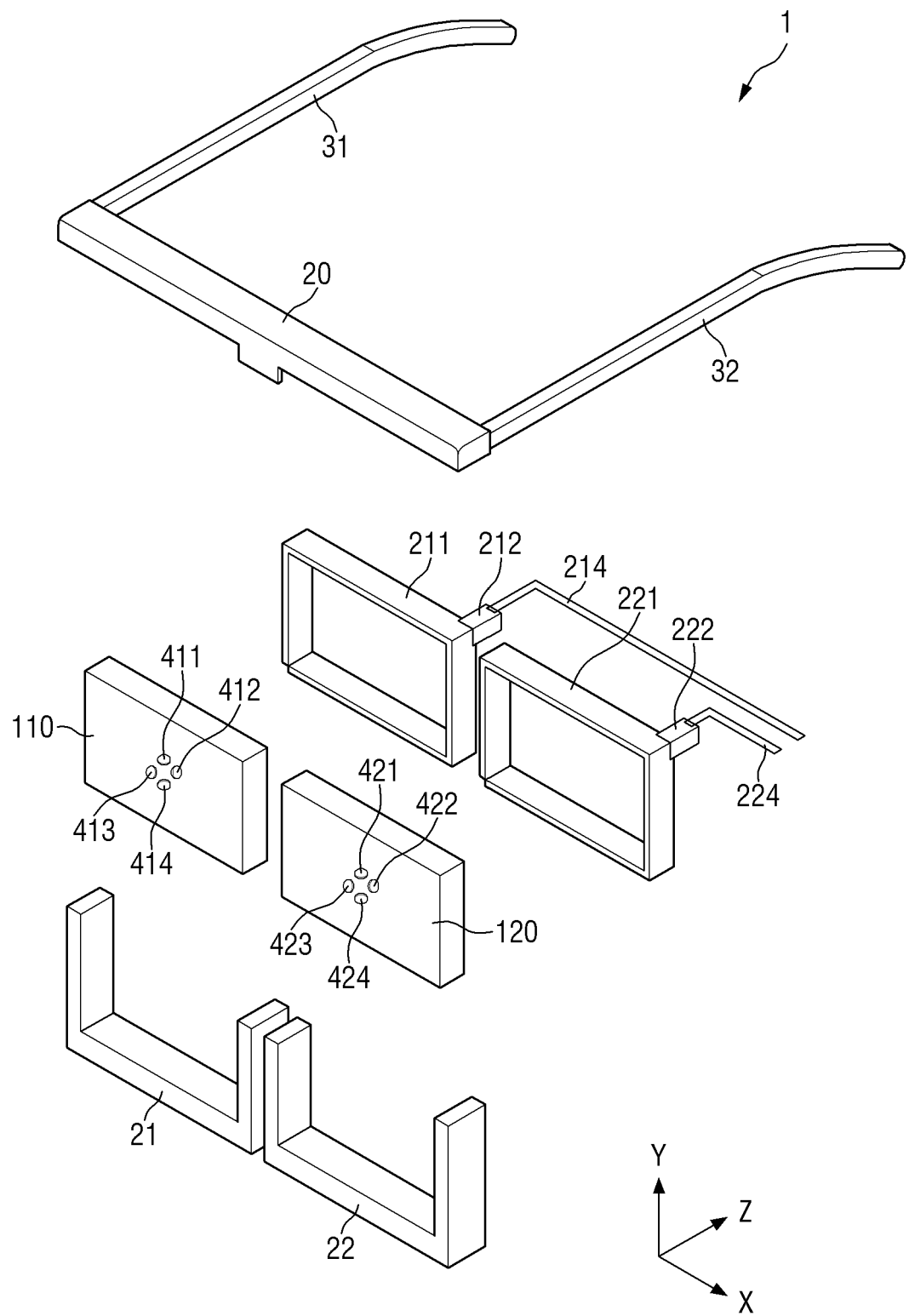
FIG. 11 is an exploded perspective view of an optical device according to another exemplary embodiment.
Figure 12:
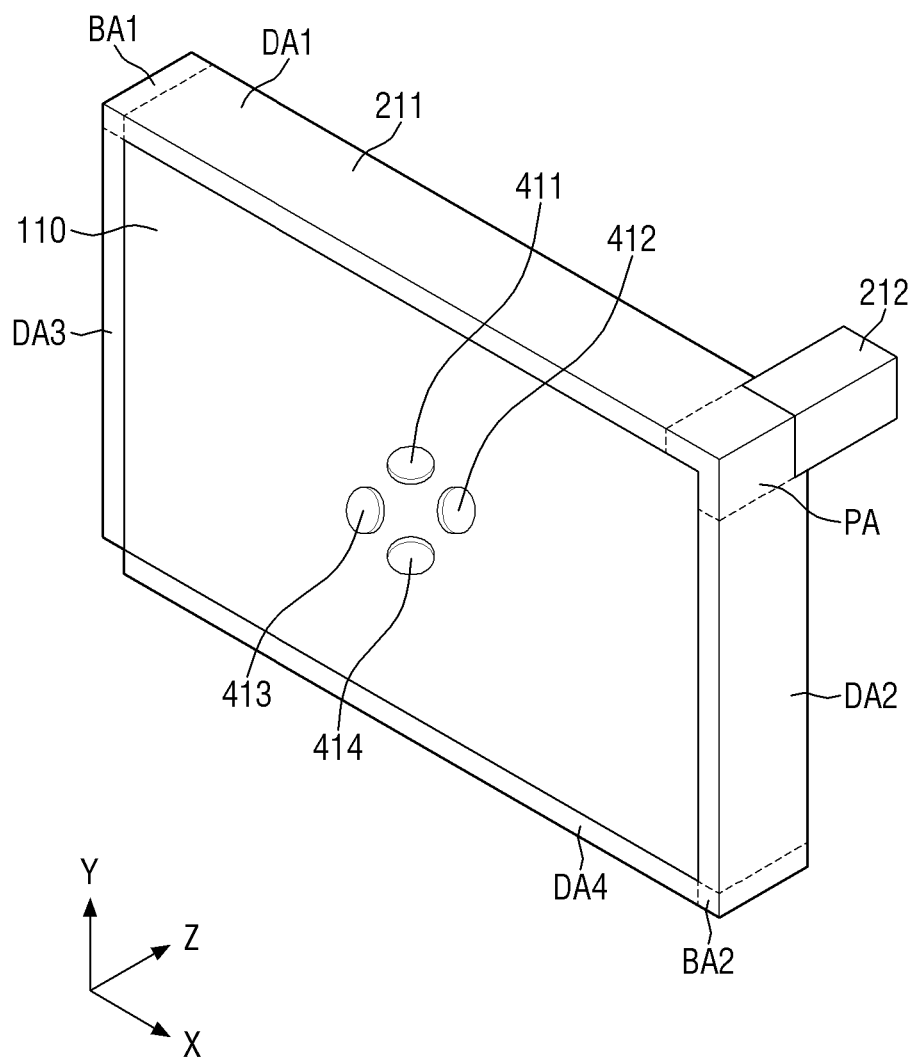
FIG. 12 is a perspective view of a first lens and a first display device of FIG. 11.

FIG. 11 is an exploded perspective view of an optical device according to an exemplary embodiment. FIG. 12 is a perspective view of a first lens and a first display device of FIG. 11. The optical device of FIGS. 11 and 12 will hereinafter be described, focusing mainly on the differences with those of FIGS. 2 and 3.

Referring to FIGS. 11 and 12, a first display panel 211 of a first display device 210 may be disposed on multiple sides of a first lens 110. The first display panel 211 may include a first display area DA1 disposed on a first side of the first lens 110, a second display area DA2 disposed on a second side of the first lens 110, a third display area DA3 disposed on a third side of the first lens 110, and a fourth display area DA4 disposed on a fourth side of the first lens 110. The first, second, third, and fourth sides of the first lens 110 may be the upper, right, left, and lower sides, respectively, of the first lens 110.

Also, the first display panel 211 may include a first bending area BA1 which is bendable or foldable between the first and third display areas DA1 and DA3, and a second bending area BA2 which is bendable or foldable between the second and fourth display areas DA2 and DA4. The first bending area BA1 can be bent at the boundary between the upper and left sides of the first lens 110. The second bending area BA2 can be bent at the boundary between the right and lower sides of the first lens 110.

Also, the first display panel 211 may include a pad area PA, which is disposed between the first and third display areas DA1 and DA3. The pad area PA can be bent at the boundary between the upper and right sides of the first lens 110.

The first and second display areas DA1 and DA2 may be connected by the pad area PA, the first and third display areas DA1 and DA3 may be connected by the first bending area BA1, and the second and fourth display areas DA2 and DA4 may be connected by the second bending area BA2. The second and third display areas DA2 and DA3 may not be connected, and be spaced apart from each other.

A first reflective member 411 may be inclined at the first angle θ1, as that in FIG. 4A, so as to reflect a first image from the first display area DA1 to provide the first image to a right eye RE of a user. The first reflective member 411 may be disposed nearest to the upper side of the first lens 110 where the first display area DA1 is disposed.

A second reflective member 412 may be inclined at the fourth angle θ4, as that in FIG. 4B, so as to reflect a second image from the second display area DA2 to provide the second image to the right eye RE of the user. The second reflective member 412 may be disposed nearest to the right side of the first lens 110 where the second display area DA2 is disposed.

A third reflective member 413 may be inclined at the second angle θ2, as that in FIG. 4B, so as to reflect a third image from the third display area DA3 to provide the third image to the right eye RE of the user. The third reflective member 413 may be disposed nearest to the left side of the first lens 110 where the third display area DA3 is disposed.

A fourth reflective member 414 may be inclined at the third angle θ3, as that in FIG. 4A, so as to reflect a fourth image from the fourth display area DA4 to provide the fourth image to the right eye RE of the user. The fourth reflective member 414 may be disposed nearest to the lower side of the first lens 110 where the fourth display area DA4 is disposed.

Referring back to FIGS. 4A and 4B, the first, second, third, and fourth angles θ1, θ2, θ3, and θ4 refer to the angles that the first, second, third, and fourth reflective members 411, 412, 413, and 414 are inclined in the height direction of the first lens 110 (or the Y-axis direction) with respect to the thickness direction of the first lens 110 (or the Z-axis direction).

The first and fourth reflective members 411 and 414 may be disposed to be symmetrical with respect to the center of the first lens 110 in the height direction of the first lens 110 (or the Y-axis direction), in which case, the first and third angles θ1 and θ3 may be substantially the same. Similarly, the second and third reflective members 412 and 413 may be disposed to be symmetrical with respect to the center of the second lens 120 in the width direction of the second lens 120 (or the X-axis direction), in which case, the second and fourth angles θ2 and θ4 may be substantially the same.

A second lens 120 and a second display device 220 can be implemented in substantially the same manner as the first lens 110 and the first display device 210, respectively, described above with reference to FIGS. 11 and 12, and thus, repeated descriptions thereof will be omitted.

FIG. 13 is a development view of a first display device of FIG. 11 according to an exemplary embodiment.

Referring to FIG. 13, a first display panel 211 of a first display device 210 may include a first display area DA1, a second display area DA2, a third display area DA3, a fourth display area DA4, a first bending area BA1, a second bending area BA2, and a pad area PA. Also, the first display device 210 may include a first scan driving circuit unit SDC1, a second scan driving circuit unit SDC2, a third scan driving circuit unit SDC3, a fourth scan driving circuit unit SDC4, and a first integrated driving circuit unit DDC1.

The first display area DA1 may include first data lines DL1, first scan lines SL1, and first pixels PX1. The first data lines DL1 may be arranged in a first direction DR1, and the first scan lines SL1 may be arranged in a second direction DR2 which intersects the first direction DR1. The first pixels PX1 may be arranged in regions that are defined by the first data lines DL1 and the first scan lines SL1. For example, the first pixels PX1 may be arranged at the intersections between the first data lines DL1 and the first scan lines SL1.

The second display area DA2 may include second data lines DL2, second scan lines SL2, and second pixels PX2. The second data lines DL2 may be arranged in the first direction DR1, and the second scan lines SL2 may be arranged in the second direction DR2. The second pixels PX2 may be arranged in regions that are defined by the second data lines DL2 and the second scan lines SL2. For example, the second pixels PX2 may be arranged at the intersections between the second data lines DL2 and the second scan lines SL2.

The third display area DA3 may include third data lines DL3, third scan lines SL3, and third pixels PX3. The third data lines DL3 may be arranged in the first direction DR1, and the third scan lines SL3 may be arranged in the second direction DR2. The third pixels PX3 may be arranged in regions that are defined by the third data lines DL3 and the third scan lines SL3. For example, the third pixels PX3 may be arranged at the intersections between the third data lines DL3 and the third scan lines SL3.

The fourth display area DA4 may include fourth data lines DL4, fourth scan lines SL4, and fourth pixels PX4. The fourth data lines DL4 may be arranged in the first direction DR1, and the fourth scan lines SL4 may be arranged in the second direction DR2. The fourth pixels PX4 may be arranged in regions that are defined by the fourth data lines DL4 and the fourth scan lines SL4. For example, the fourth pixels PX4 may be arranged at the intersections between the fourth data lines DL4 and the fourth scan lines SL.

As illustrated in FIG. 12, the length in the width direction (or the X-axis direction) of the first lens 110 is greater than the length in the height direction (or the Y-axis direction) of the first lens 110. As such, the lengths in the first direction DR1 of the first and fourth display areas DA1 and DA4, which are disposed on the upper and lower sides, respectively, of the first lens 110, may be greater than the lengths in the first direction DR1 of the second and third display areas DA2 and DA4, which are disposed on the right and left sides, respectively, of the first lens 110. Also, as illustrated in FIG. 12, when the length in the thickness direction (or the Z-axis direction) of the first lens 110 is uniform on all the sides of the first lens 110, the lengths in the second direction DR2 of the first, second, third, and fourth display areas DA1, DA2, DA3, and DA4 may be substantially the same as each other.

The first bending area BA1 may be disposed between the first and third display areas DA1 and DA3. The first bending area BA1 may include first data connecting lines DCL1, which connect the first data lines DL1 and the third data lines DL3. The first bending area BA1 may include first carry signal lines CRL1, which connect the first and third scan driving circuit units SDC1 and SDC3. No pixels may be formed in the first bending area BA1.

The second bending area BA2 may be disposed between the second and fourth display areas DA2 and DA4. The second bending area BA2 may include second data connecting lines DCL2, which connect the second data lines DL3 and the fourth data lines DL4. The second bending area BA2 may include second carry signal lines CRL2, which connect the second and fourth scan driving circuit units SDC2 and SDC4. No pixels may be formed in the second bending area BA2.

The pad area PA may be disposed between the first and second display areas DA1 and DA2. The pad area PA may include routing lines, which are connected to the first integrated driving circuit unit DDC1 and pads DP. The pads DP may be electrically connected to a circuit board 212. The circuit board 212 may be attached on the pads DP via an anisotropic conductive film, for example.

The first display panel 211 may be formed to be thinner in the first, second, and third bending areas BA1, BA2, and BA3 and in the pad area PA than in the first, second, third, and fourth display areas DA1, DA2, DA3, and DA4 to reduce bending stress. For example, some of the inorganic and organic films formed in the first, second, third, and fourth display areas DA1, DA2, DA3, and DA4 may not be formed in the first, second, and third bending areas BA1, BA2, and BA3 and in the pad area PA.

The first scan driving circuit unit SDC1 may be disposed on a first side of the first display area DA1. The first scan driving circuit unit SDC1 may be disposed adjacent to a long side of the first display area DA1. The first scan driving circuit unit SDC1 is connected to the first scan lines SL1 of the first display area DA1. The first scan driving circuit unit SDC1 may receive a scan control signal from the first integrated driving circuit unit DDC1, may generate first scan signals in accordance with the received scan control signal, and may sequentially apply the first scan signals to the first scan lines SL1.

The second scan driving circuit unit SDC2 may be disposed on a first side of the second display area DA2. The second scan driving circuit unit SDC2 may be disposed adjacent to a long side of the second display area DA2. The second scan driving circuit unit SDC2 is connected to the second scan lines SL2 of the second display area DA2. The second scan driving circuit unit SDC2 may receive a scan control signal from the second integrated driving circuit unit DDC2, may generate second scan signals in accordance with the received scan control signal, and may sequentially apply the second scan signals to the second scan lines SL2.

The third scan driving circuit unit SDC3 may be disposed on a first side of the third display area DA3. The third scan driving circuit unit SDC3 may be disposed adjacent to a long side of the third display area DA3. The third scan driving circuit unit SDC3 is connected to the third scan lines SL3 of the third display area DA3. The third scan driving circuit unit SDC3 may receive first carry signals from the first scan driving circuit unit SDC1 via the first carry signal lines CRL1, may generate third scan signals in accordance with the first carry signals, and may sequentially apply the third scan signals to the third scan lines SL3. The third scan driving circuit unit SDC3 may output the last scan signal output from the first scan driving circuit unit SDC1 as a carry signal.

The fourth scan driving circuit unit SDC4 may be disposed on a first side of the fourth display area DA4. The fourth scan driving circuit unit SDC4 may be disposed adjacent to a long side of the fourth display area DA4. The fourth scan driving circuit unit SDC4 may receive second carry signals from the second scan driving circuit unit SDC2 via the second carry signal lines CRL2, may generate fourth scan signals in accordance with the second carry signals, and may sequentially apply the fourth scan signals to the fourth scan lines SL4. The fourth scan driving circuit unit SDC4 may output the last scan signal output from the second scan driving circuit unit SDC2 as a carry signal.

Each of the first, second, third, and fourth scan driving circuit units SDC1, SDC2, SDC3, and SDC4 may include TFTs as switching elements. In this case, the TFTs of each of the first, second, third, and fourth scan driving circuit units SDC1, SDC2, SDC3, and SDC4 may be formed together with the TFTs of the first pixels PX1 of the first display area DA1, the TFTs of the second pixels PX2 of the second display area DA2, the TFTs of the third pixels PX3 of the third display area DA3, and the TFTs of the fourth pixels PX4 of the fourth display area DA4.

The first integrated driving circuit unit DDC1 may be disposed in the pad area PA. The first integrated driving circuit unit DDC1 may extend in the second direction DR2. The first integrated driving circuit unit DDC1 receives timing signals, first video data, second video data, third video data, and fourth video data via the routing lines. The first integrated driving circuit unit DDC1 may generate a scan control signal from the timing signals, and output the generated scan control signal to the first and second scan driving circuit units SDC1 and SDC2.

The first integrated driving circuit unit DDC1 may generate a data control signal from the timing signals. The first integrated driving circuit unit DDC1 may generate first data voltages in accordance with the data control signal and the first video data, while the first scan signals are being applied, and may apply the first data voltages to the first data lines DL1, the first data connecting lines DCL1, and the third data lines DL3. The first integrated driving circuit unit DDC1 may generate second data voltages in accordance with the data control signal and the second video data, while the second scan signals are being applied, and may apply the second data voltages to the second data lines DL2, the second data connecting lines DCL2, and the fourth data lines DL4.

Also, the first integrated driving circuit unit DDC1 may generate third data voltages in accordance with the data control signal and the third video data, while the third scan signals are being applied, and may apply the third data voltages to the first data lines DL1, the first data connecting lines DCL1, and the third data lines DL3. The first integrated driving circuit unit DDC1 may generate fourth data voltages in accordance with the data control signal and the fourth video data, while the fourth scan signals are being applied, and may apply the fourth data voltages to the second data lines DL2, the second data connecting lines DCL2, and the fourth data lines DL4.

The first integrated driving circuit unit DDC1 may be formed as an IC.

According to the illustrated exemplary embodiment of FIG. 13, since the first display device 210 includes multiple bending areas that can be bent, i.e., the first, second, and third bending areas BA1, BA2, and BA3, the first display device 210 can be easily bent along the boundaries between the upper and left sides of the first lens 110, between the left and lower sides of the first lens 110, and between the lower and right sides of the first lens 110.

Also, according to the illustrated exemplary embodiment of FIG. 13, each of the first pixels PX1 of the first display area DA1, the second pixels PX2 of the second display area DA2, the third pixels PX3 of the third display area DA3, and the fourth pixels PX4 of the fourth display area DA4 may receive data voltages from a single integrated driving circuit unit, e.g., the first integrated driving circuit unit DDC1.

FIG. 13 illustrates that a single integrated driving circuit unit is disposed in the pad area PA, but the inventive concepts are not limited thereto. For example, in some exemplary embodiments, two integrated driving circuit units may be disposed in the pad area PA, in which case, one of the two integrated driving circuit units may be connected to the first data lines DL1, the first data connecting lines DCL1, and the third data lines DL3, and the other integrated driving circuit unit may be connected to the second data lines DL2, the second data connecting lines DCL2, and the fourth data lines DL4.

Also, as illustrated in FIG. 8, integrated driving circuit units may be additionally disposed in the first and second bending areas BA1 and BA2. In this case, the first data connecting lines DCL1 may not be formed in the first bending area BA1, and the second data connecting lines DCL2 may not be formed in the second bending area BA2. The integrated driving circuit unit disposed in the first bending area BA1 may be connected to the third data lines DL3, and the integrated driving circuit unit disposed in the second bending area BA2 may be connected to the fourth data lines DL4. The integrated driving circuit unit disposed in the first bending area BA1 may be substantially the same as the third integrated driving circuit unit DDC3 of FIGS. 8 and 9, and thus, repeated descriptions thereof will be omitted. Also, the integrated driving circuit unit disposed in the second bending area BA2 may be substantially the same as the fourth integrated driving circuit unit DDC4 of FIGS. 8 and 9, and thus, repeated descriptions of thereof will be omitted.

A second display device 220 can be implemented in substantially the same manner as the first display device 210 described above with reference to FIG. 13, and thus, repeated descriptions thereof will be omitted.

Figure 14:
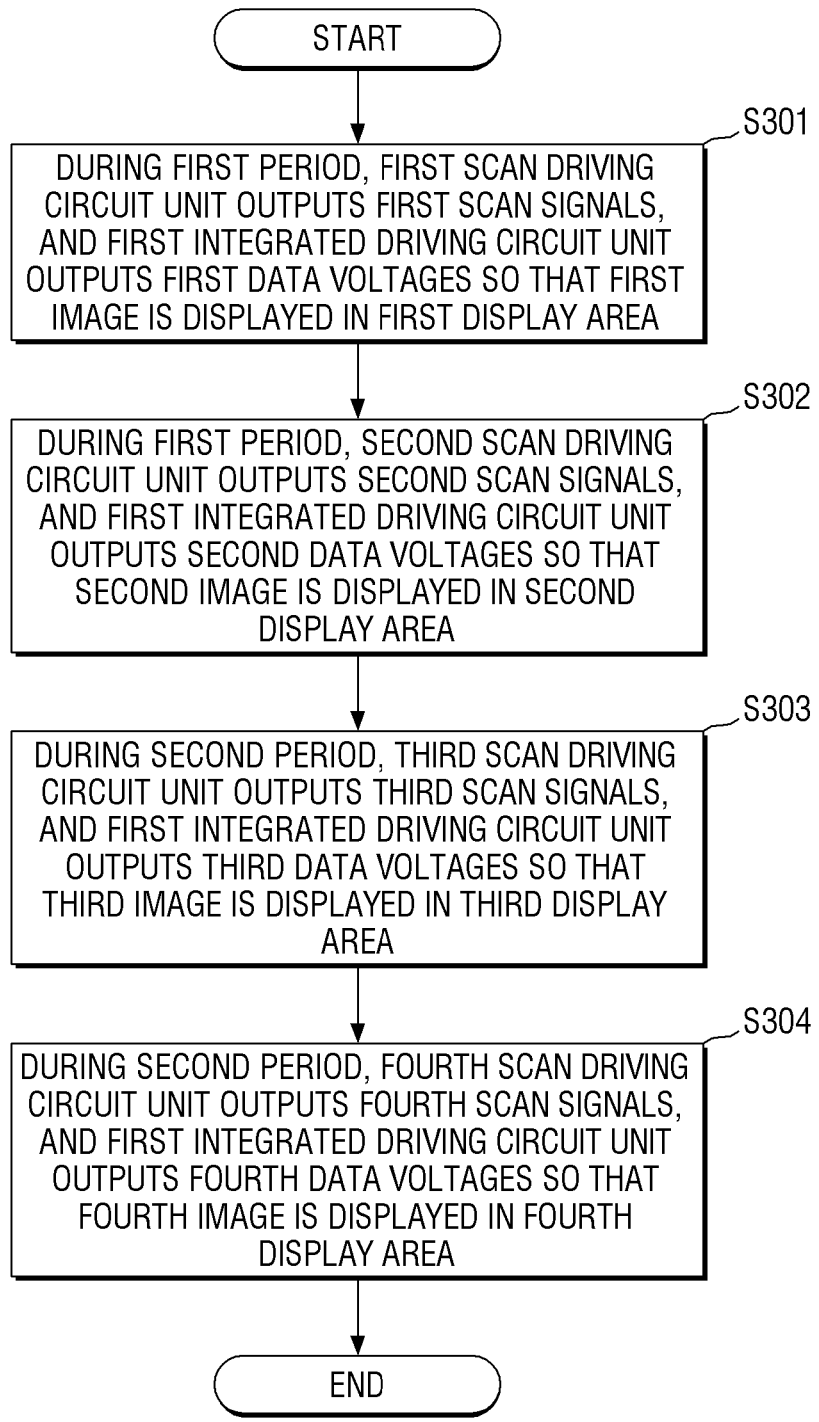
FIG. 14 is a flowchart exemplarily illustrating a driving method of the first display device of FIG. 11.

FIG. 14 is a flowchart exemplarily illustrating a driving method of the first display device of FIG. 11.

Referring to FIG. 14, in S301, during a first period, the first scan driving circuit unit SDC1 sequentially applies the first scan signals to the first scan lines SL1, and the first integrated driving circuit unit DDC1 applies the first data voltages to the first data lines DL1, the first data connecting lines DCL1, and the third data lines DL3. Accordingly, the first pixels PX1 of the first display area DA1 can display the first image in accordance with the first data voltages. The first image in the first display area DA1 may be reflected by the first reflective member 411 to be provided to the right eye RE of the user.

In S302, during the first period, the second scan driving circuit unit SDC2 sequentially applies the second scan signals to the second scan lines SL2, and the first integrated driving circuit unit DDC1 applies the second data voltages to the second data lines DL2, the second data connecting lines DCL2, and the fourth data lines DL4. Accordingly, the second pixels PX2 of the second display area DA2 can display the second mage in accordance with the second data voltages. The second mage in the second display area DA2 may be reflected by the second reflective member 412 to be provided to the right eye RE of the user.

In S303, during a second period, the third scan driving circuit unit SDC3 sequentially applies the third can signals to the third scan lines SL3, and the first integrated driving circuit unit DDC1 applies the third data voltages to the first data lines DL1, the first data connecting lines DCL1, and the third data lines DL3. Accordingly, the third pixels PX3 of the third display area DA3 can display the third image in accordance with the third data voltages. The third image in the third display area DA3 may be reflected by the third reflective member 413 to be provided to the right eye RE of the user.

In S304, during the second period, the fourth scan driving circuit unit SDC4 sequentially applies the fourth signals to the fourth scan lines SL4, and the first integrated driving circuit unit DDC1 applies the fourth data voltages to the second data lines DL2, the second data connecting lines DCL2, and the fourth data lines DL4. Accordingly, the fourth pixels PX4 of the fourth display area DA4 can display the fourth image in accordance with the fourth data voltages. The fourth image in the fourth display area DA4 may be reflected by the fourth reflective member 414 to be provided to the right eye RE of the user.

According to the illustrated exemplary embodiment of FIG. 14, the first, second, third, and fourth images of the first, second, third, and fourth display areas DA1, DA2, DA3, and DA4 can be provided to the right eye RE of the user. Thus, since the user can view four virtual images together with a real-world image, the area of the first display device 210 actually being viewed by the user, i.e., the FOV of the user, can be widened.

A driving method of the second display device 220 is substantially the same as that described above with reference to FIG. 14, and thus, repeated descriptions thereof will be omitted.

FIG. 15 is a development view of a first display device of FIG. 11 according to another exemplary embodiment.

The first display device of FIG. 15 differs from that of FIG. 13, in that a first integrated driving circuit unit DDC1 is disposed on a first side of a first display area DA1, that a second integrated driving circuit unit DDC2 is disposed on a first side of a second display area DA2, that a third integrated driving circuit unit DDC3 is disposed on a first side of a third display area DA3, that a fourth integrated driving circuit unit DDC4 is disposed on a first side of a fourth display area DA1, and that a first scan driving circuit unit SDC1 is disposed in a pad area PA. The first display device according to the illustrated exemplary embodiment of FIG. 15 will hereinafter be described, focusing mainly on the differences with those of FIGS. 5 and 13.

Referring to FIG. 15, the first scan driving circuit unit SDC1 may be disposed in the pad area PA. The first scan driving circuit unit SDC1 may extend in a second direction DR2. The first scan driving circuit unit SDC1 may be connected to first scan lines SL1 of the first display area DA1, third scan lines SL3 of the third display area DA3, and first scan connecting lines SCL1 which connect the first scan lines SL1 and the third scan lines SL3. Also, the first scan driving circuit unit SDC1 may be connected to second scan lines SL2 of the second display area DA2, fourth scan lines SL4 of the fourth display area DA4, and second scan connecting lines SCL2 which connect the second scan lines SL2 and the fourth scan lines SL4.

The first scan driving circuit unit SDC1 may receive a scan control signal from the first integrated driving circuit unit DDC1 and may generate scan signals in accordance with the scan control signal. The first scan driving circuit unit SDC1 may sequentially apply the scan signals to the first scan lines SL1, the first scan connecting lines SCL1, and the third scan lines SL3, and, at the same time, may sequentially apply the scan signals to the second scan lines SL2, the second scan connecting lines SCL2, and the fourth scan lines SL4.

The first integrated driving circuit unit DDC1 may be disposed on the first side of the first display area DA1. The first integrated driving circuit unit DDC1 may be disposed adjacent to a long side of the first display area DA1. The first integrated driving circuit unit DDC1 receives first timing signals and first video data via routing lines connected to pads DP. The first integrated driving circuit unit DDC1 may generate a scan control signal from the first timing signals and may output the scan control signal to the first scan driving circuit unit SDC1. The first integrated driving circuit unit DDC1 may generate a first data control signal from the first timing signals. The first integrated driving circuit unit DDC1 may generate first data voltages in accordance with the first data control signal and the first video data, while the scan signals are being applied, and may apply the first data voltages to first data lines DL1.

The second integrated driving circuit unit DDC2 may be disposed on the first side of the second display area DA2. The second integrated driving circuit unit DDC2 may be disposed adjacent to a long side of the second display area DA2. The second integrated driving circuit unit DDC2 receives the first timing signals and second video data via the routing lines connected to the pads DP. The second integrated driving circuit unit DDC2 may generate a second data control signal from the first timing signals. The second integrated driving circuit unit DDC2 may generate second data voltages in accordance with the second data control signal and the second video data, while the scan signals are being applied, and may apply the second data voltages to second data lines DL2.

The third integrated driving circuit unit DDC3 may be disposed on the first side of the third display area DA3. The third integrated driving circuit unit DDC3 may be disposed adjacent to a long side of the third display area DA3. The third integrated driving circuit unit DDC3 receives the first timing signals and third video data via the routing lines connected to the pads DP. The third integrated driving circuit unit DDC3 may generate a third data control signal from the first timing signals. The third integrated driving circuit unit DDC3 may generate third data voltages in accordance with the third data control signal and the third video data, while the scan signals are being applied, and may apply the third data voltages to third data lines DL3.

The fourth integrated driving circuit unit DDC4 may be disposed on the first side of the fourth display area DA4. The fourth integrated driving circuit unit DDC4 may be disposed adjacent to a long side of the fourth display area DA4. The fourth integrated driving circuit unit DDC4 receives the first timing signals and fourth video data via the routing lines connected to the pads DP. The fourth integrated driving circuit unit DDC4 may generate a fourth data control signal from the first timing signals. The fourth integrated driving circuit unit DDC4 may generate fourth data voltages in accordance with the fourth data control signal and the fourth video data, while the scan signals are being applied, and may apply the fourth data voltages to fourth data lines DL4.

The first scan driving circuit unit SDC1 sequentially applies the scan signals to the first scan lines SL1 and the third scan lines SL3, the first integrated driving circuit unit DDC1 applies the first data voltages to the first data lines DL1, and the third integrated driving circuit unit DDC3 applies the third data voltages to the third data lines DL3. Accordingly, first pixels PX1 of the first display area DA1 can display a first image in accordance with the first data voltages, and third pixels PX3 of the third display area DA3 can display a third image in accordance with the third data voltages. The first image in the first display area DA1 may be reflected by the first reflective member 411 to be provided to the right eye RE of the user, and the third image in the third display area DA3 may be reflected by the third reflective member 413 to be provided to the right eye RE of the user.

Also, the first scan driving circuit unit SDC1 sequentially applies the scan signals to the second scan lines SL2 and the fourth scan lines SL4, the second integrated driving circuit unit DDC2 applies the second data voltages to the second data lines DL2, and the fourth integrated driving circuit unit DDC4 applies the fourth data voltages to the fourth data lines DL4. Accordingly, second pixels PX2 of the second display area DA2 can display a second image in accordance with the second data voltages, and fourth pixels PX4 of the fourth display area DA4 can display a fourth image in accordance with the fourth data voltages. The second image in the second display area DA2 may be reflected by the second reflective member 412 to be provided to the right eye RE of the user, and the fourth image in the fourth display area DA4 may be reflected by the fourth reflective member 414 to be provided to the right eye RE of the user.

According to the illustrated exemplary embodiment of FIG. 15, since the transmission length of the third data voltages can be reduced, as compared to a case where the first integrated driving circuit unit DDC1 applies the third data voltages to the first data lines DL1, first data connecting lines DCL1, and the third data lines DL3, as illustrated in FIG. 13, the influence of wiring resistance on the third data voltages can be reduced. Also, since the transmission length of the fourth data voltages can be reduced, as compared to a case where the first integrated driving circuit unit DDC1 applies the fourth data voltages to the second data lines DL2, second data connecting lines DCL2, and the fourth data lines DL4, as illustrated in FIG. 13, the influence of wiring resistance on the fourth data voltages can be reduced.

Also, scan driving circuit units may be additionally disposed in first and second bending areas BA1 and BA2. In this case, the first scan connecting lines SCL1 may not be formed in the first bending area BA1, and the second scan connecting lines SCL2 may not be formed in the second bending area BA2. The scan driving circuit unit disposed in the first bending area BA1 may be connected to the third scan lines SL3, and the scan driving circuit unit disposed in the second bending area BA2 may be connected to the fourth scan lines SL4. In this case, the first scan driving circuit unit SDC1 may output the first scan signals to the first scan lines, SL1, the second scan driving circuit unit SDC2 may output the second scan signals to the second scan lines SL2, the third scan driving circuit unit SDC3 may output the third scan signals to the third scan lines SL3, and the fourth scan driving circuit unit SDC4 may output the fourth scan signals to the fourth scan lines SL4.

A second display device 220 can be implemented in substantially the same manner as the display device 210 described above with reference to FIG. 15, and thus, repeated descriptions thereof will be omitted.

Figure 16:
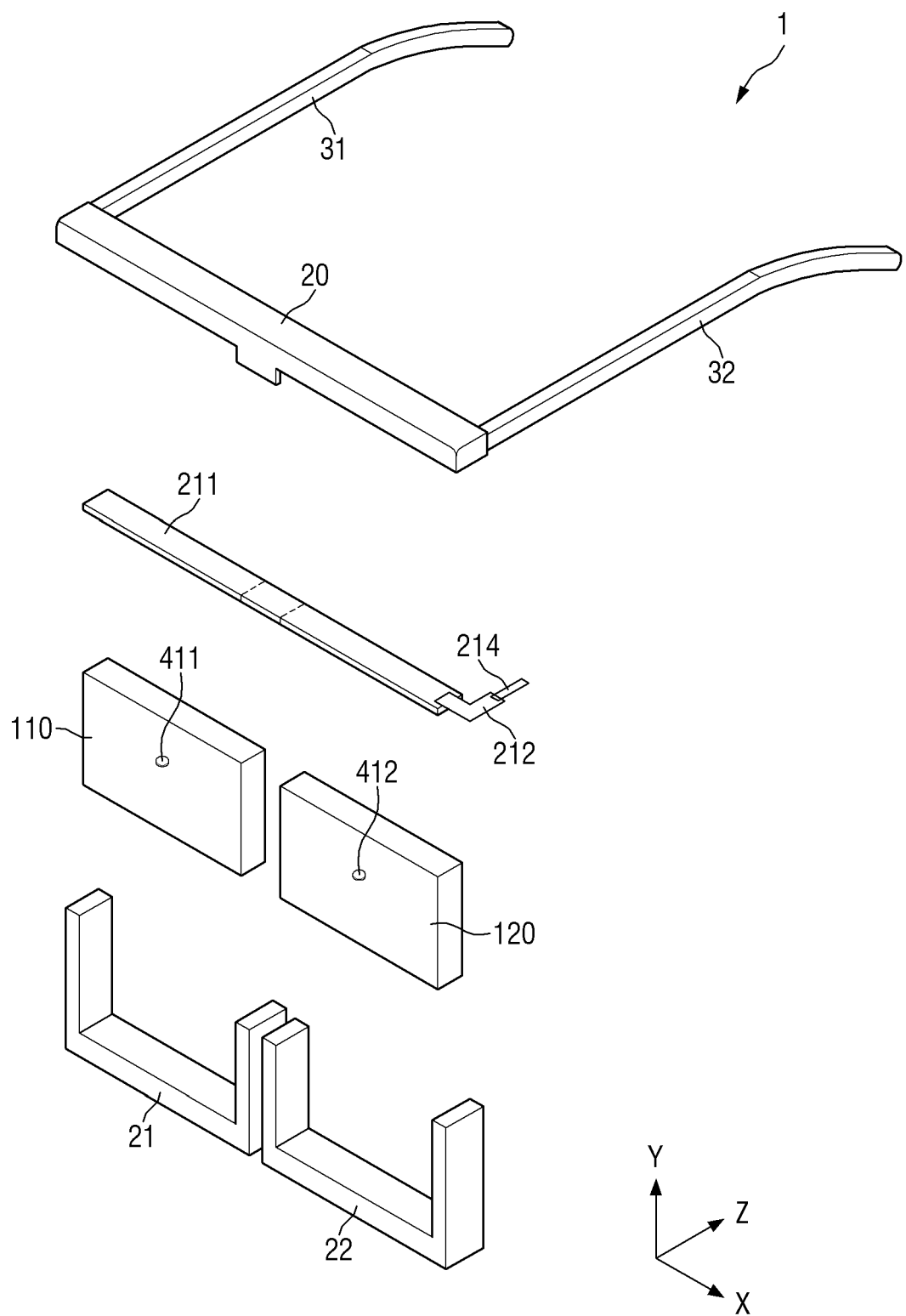
FIG. 16 is an exploded perspective view of an optical device according to another exemplary embodiment.
Figure 17:
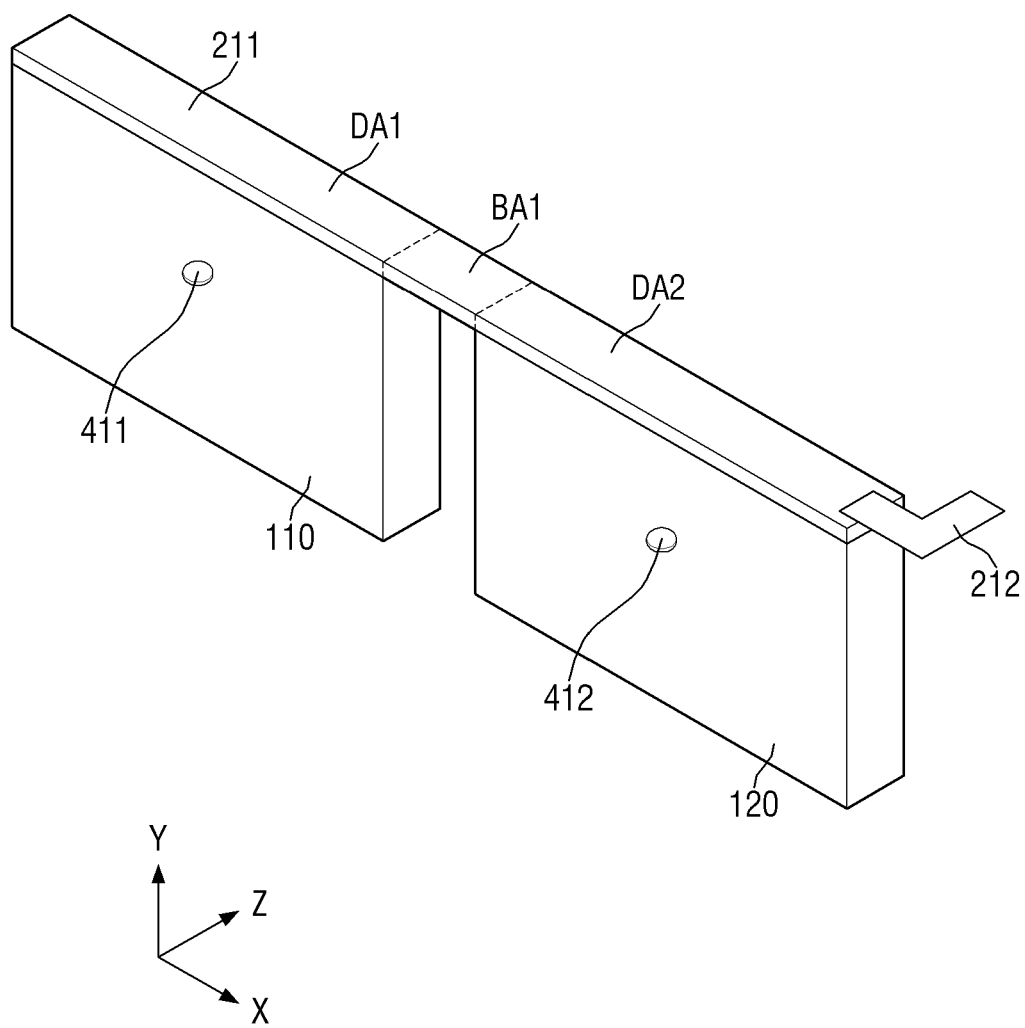
FIG. 17 is a perspective view illustrating a first lens, a second lens, and a first display device of FIG. 16.

FIG. 16 is an exploded perspective view of an optical device according to another exemplary embodiment. FIG. 17 is a perspective view illustrating a first lens, a second lens, and a first display device of FIG. 16. The optical device of FIGS. 16 and 17 will hereinafter be described, focusing mainly on the differences with those of FIGS. 2 and 3.

Referring to FIGS. 16 and 17, a first display panel 211 of a first display device is disposed on at least one side of a first lens 110 and on at least one side of a second lens 120. The first display panel 211 may include a first display area DA1 which is disposed on a first side of the first lens 110, and a second display area DA2 which is disposed on a first side of the second lens 120. The first sides of the first and second lenses 110 and 120 may be the upper sides of the first and second lenses 110 and 120, without being limited thereto.

The first display panel 211 may include a first bending area BA1, which is bendable or foldable between the first and second display areas DA1 and DA2. The first and second display areas DA1 and DA2 may be connected by the first bending area BA1.

A first reflective member 411 may be inclined at the first angle θ1, as that of FIG. 4A, so as to reflect a first image from the first display area DA1 to provide the first image to a right eye RE of a user. A second reflective member 412 may also be inclined at the first angle θ1, so as to reflect a second image from the second display area DA2 to provide the second image to a left eye LE of the user. As illustrated in FIGS. 4A and 4B, the first angle θ1 refers to the angle that the first and second reflective members 411 and 412 are inclined in the height direction of the first lens 110 (or the Y-axis direction) with respect to the thickness direction of the first lens 110 (or the Z-axis direction).

FIGS. 16 and 17 illustrate that a single reflective member, i.e., the first reflective member 411, is disposed in the first lens 110, and that a single reflective member, i.e., the second reflective member 412, is disposed in the second lens 120, but the inventive concepts are not limited to a particular number of reflective members provided in each of the first and second lenses 110 and 120.

The first display panel 211 may further include a third display area, which extends from the first display area DA1, and is disposed on the left side of the first lens 110. In this case, a second bending area may be disposed between the first display area DA1 and the third display area. The second bending area may be bent at the boundary between the upper and left sides of the first lens 110.

Also, the first display panel 211 may further include a fourth display area, which extends from the second display area DA2, and is disposed on the right side of the second lens 120. In this case, a third bending area may be disposed between the second display area DA2 and the fourth display area. The third bending area may be bent at the boundary between the upper and right sides of the second lens 120.

According to the illustrated exemplary embodiment of FIGS. 16 and 17, the first image displayed in the first display area DA1 of the first display device 210, which is disposed on the first side of the first lens 110, can be reflected toward the first surface of the first lens 110 by the first reflective member 411. Also, the second image displayed in the second display area DA2 of the first display device 210, which is disposed on the first side of the second lens 120, can be reflected toward the first surface of the second lens 120 by the second reflective member 412. Accordingly, virtual images can be provided to both the left and right eyes LE and RE of the user by using a single display device.

FIG. 18 is a development view of a first display device of FIG. 16 according to an exemplary embodiment.

Referring to FIG. 18, the first display panel 211 of the first display device 210 may include a first display area DA1, a second display area DA2, a first bending area BA1, and a pad area PA. Also, the first display device 210 may include a first scan driving circuit unit SDC1, a second scan driving circuit unit SDC2, and a first integrated driving circuit unit DDC1.

The first display area DA1 may include first data lines DL1, first scan lines SL1, and first pixels PX1. The first data lines DL1 may be arranged in a first direction DR1, and the first scan lines SL1 may be arranged in a second direction DR2 which intersects the first direction DR1. The first pixels PX1 may be arranged in regions that are defined by the first data lines DL1 and the first scan lines SL1. For example, the first pixels PX1 may be arranged at the intersections between the first data lines DL1 and the first scan lines SL1.

The second display area DA2 may include second data lines DL2, second scan lines SL2, and second pixels PX2. The second data lines DL2 may be arranged in the first direction DR1, and the second scan lines SL2 may be arranged in the second direction DR2. The second pixels PX2 may be arranged in regions that are defined by the second data lines DL2 and the second scan lines SL2. For example, the second pixels PX2 may be arranged at the intersections between the second data lines DL2 and the second scan lines SL2.

Since the length in the width direction (or the X-axis direction) of the first lens 110 is substantially the same as the length in the width direction (or the X-axis direction) of the second lens 120, as illustrated in FIG. 18, the length in the first direction DR1 of the first display area DA1, which is disposed on the upper side of the first lens 110, may be substantially the same as the length in the first direction DR1 of the second display area DA2, which is disposed on the upper side of the second lens 120. Also, when the length in the thickness direction (or the Z-axis direction) of the first lens 110 is uniform on each side of the first lens 110, and the length in the thickness direction (or the Z-axis direction) of the second lens 120 is uniform on each side of the second lens 120, as illustrated in FIG. 18, the lengths in the second direction DR2 of the first and second display areas DA1 and DA2 may be substantially the same.

The first bending area BA1 may be disposed between the first and second display areas DA1 and DA2. The first bending area BA1 may include first data connecting lines DCL1, which connect the first data lines DL1 and the second data lines DL2. The first bending area BA1 may include second carry signal lines CRL2, which connect the first and second scan driving circuit units SDC1 and SDC2. No pixels may be formed in the first bending area BA1.

The pad area PA includes routing lines RL, which are connected to the first integrated driving circuit unit DDC1, and pads DP, which are connected to the routing lines RL. The pads DP may be electrically connected to a circuit board 212. The circuit board 212 may be attached on the pads DP via an anisotropic conductive film, for example.

The first display panel 211 may be formed to be thinner in the first bending area BA1 than in the first, second, third, and fourth display areas DA1, DA2, DA3, and DA4 to reduce bending stress. For example, some of the inorganic and organic films formed in the first, second, third, and fourth display areas DA1, DA2, DA3, and DA4 may not be formed in the first bending area BA1.

The first scan driving circuit unit SDC1 may be disposed on a first side of the first display area DA1. The first scan driving circuit unit SDC1 may be disposed adjacent to a long side of the first display area DA1. The first scan driving circuit unit SDC1 is connected to the first scan lines SL1 of the first display area DA1. The first scan driving circuit unit SDC1 may receive first carry signals from the second scan driving circuit unit SDC2 via first carry signal lines CRL1. The first scan driving circuit unit SDC1 may generate first scan signals in accordance with the first carry signals, and may sequentially apply the first scan signals to the first scan lines SL1.

The second scan driving circuit unit SDC2 may be disposed on a first side of the second display area DA2. The second scan driving circuit unit SDC2 may be disposed adjacent to a long side of the second display area DA2. The second scan driving circuit unit SDC2 is connected to the second scan lines SL2 of the second display area DA2. The second scan driving circuit unit SDC2 may receive a scan control signal from the first integrated driving circuit unit DDC1, may generate second scan signals in accordance with the scan control signal, and may sequentially apply the second scan signals to the second scan lines SL2.

Each of the first and second scan driving circuit units SDC1 and SDC2 may include TFTs as switching elements. In this case, the TFTs of each of the first and second scan driving circuit units SDC1 and SDC2 may be formed together with the TFTs of the first pixels PX1 of the first display area DA1 and the TFTs of the second pixels PX2 of the second display area DA2.

The first integrated driving circuit unit DDC1 may be disposed in the pad area PA. The first integrated driving circuit unit DDC1 may extend in the second direction DR2. The first integrated driving circuit unit DDC1 may receive timing signals, first video data, and second video data via the routing lines RL. The first integrated driving circuit unit DDC1 may generate a scan control signal from the timing signals, and may output the scan control signal to the second scan driving circuit unit SDC2. The first integrated driving circuit unit DDC1 may be formed as an IC.

The first integrated driving circuit unit DDC1 may generate a data control signal from the timing signals. The first integrated driving circuit unit DDC1 may generate second data voltages in accordance with the data control signal and the second video data, while the second scan signals are being applied, and may apply the second data voltages to the first data lines DL1, the first data connecting lines DCL1, and third data lines DL3. The first integrated driving circuit unit DDC1 may generate first data voltages in accordance with the data control signal and the first video data, while the first scan signals are being applied, and may apply the first data voltages to the first data lines DL1, the first data connecting lines DCL1, and the third data lines DL3

According to the illustrated exemplary embodiment of FIG. 18, since the first display device 210 includes the first bending area BA1, which can be bent, virtual images can be provided to the first sides of the first and second lenses 110 and 120 by using a single display device.

Also, according to the illustrated exemplary embodiment of FIG. 18, the first pixels PX1 of the first display area DA1 and the second pixels PX2 of the second display area DA2 can be provided with data voltages by a single integrated driving circuit unit, i.e., the first integrated driving circuit unit DDC1.

Also, as illustrated in FIG. 8, an integrated driving circuit unit may be additionally disposed in the first bending area BA1. In this case, the first data connecting lines DCL1 may not be formed in the first bending area BA1. The integrated driving circuit unit disposed in the first bending area BA1 may be connected to the first data lines DL1. The integrated driving circuit unit disposed in the first bending area BA1 may be substantially the same as the third integrated driving circuit unit DDC3 of FIGS. 8 and 9, and thus, repeated descriptions thereof will be omitted.

A second display device 220 can be implemented in substantially the same manner as the first display device 210 described above with reference to FIG. 18, and thus, repeated detailed descriptions thereof will be omitted.

FIG. 19 is a flowchart exemplarily illustrating a driving method of the first display device of FIG. 16.

Referring to FIG. 19, in S401, during a first period, the second scan driving circuit unit SDC2 sequentially applies the second scan signals to the second scan lines SL2, and the first integrated driving circuit unit DDC1 applies the second data voltages to the first data lines DL1, the first data connecting lines DCL1, and the second data lines DL2. Accordingly, the second pixels PX2 of the second display area DA2 can display the second image in accordance with the second data voltages. The second image in the second display area DA2 may be reflected by the second reflective member 412 to be provided to the right eye RE of the user.

In S402, during a second period, the first scan driving circuit unit SDC1 sequentially applies the first scan signals to the first scan lines SL1, and the first integrated driving circuit unit DDC1 applies the first data voltages to the first data lines DL1, the first data connecting lines DCL1, and the second data lines DL2. Accordingly, the first pixels PX1 of the first display area DA1 can display the first image in accordance with the first data voltages. The first image in the first display area DA1 may be reflected by the first reflective member 411 to be provided to the right eye RE of the user.

A driving method of the second display device 220 is substantially the same as that described above with reference to FIG. 19, and thus, repeated descriptions thereof will be omitted.

According to the exemplary embodiments, an image from a display device disposed on multiple sides of a lens is reflected toward the first surface of the lens by using a plurality of reflective members. As such, a user can view a plurality of virtual images together with a real-world image, and thus, the area of the display device actually being viewed by the user, i.e., the FOV of the user, can be widened.

In addition, since a display device includes bending areas that can be bent, virtual images can be provided to first sides of first and second lenses. The virtual image provided to the first side of the first lens can be input to the right eye of the user by a first reflective member of the first lens. The virtual image provided to the first side of the second lens can be input to the right eye of the user by a second reflective member of the second lens. Accordingly, virtual images can be provided to the left and right eyes of the user by using a single display device.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A flexible display device comprising:
    a first display area including first data lines arranged in a first direction, and first scan lines arranged in a second direction intersecting the first direction;
    a second display area including second data lines arranged in the first direction, and second scan lines arranged in the second direction;

a first driver adjacent to a side of the first display area;

a second driver adjacent to a side of the second display area; and a third driver between the first display area and the second display area, wherein the third driver is connected to the first data lines and the second data lines, and wherein the third driver is configured to output first data voltages to the first data lines and the second data voltages to the second data lines.

2. The flexible display device of claim 1, wherein:

the first display area is disposed on a first side of the third driver; and the second display area is disposed on a second side of the third driver opposing the first side of the third driver.

3. The flexible display device of claim 1, further comprising:

a third display area including third data lines arranged in the first direction, and third scan lines arranged in the second direction; and a first bending area between the third display area and the first display area.

4. The flexible display device of claim 3, further comprising first data connecting lines disposed in the first bending area and connected to the first data lines and the third data lines.

5. The flexible display device of claim 1, wherein:

the first driver is configured to apply first data signals to the first data lines of the first display area;

the second driver is configured to apply second data signals to the second data lines of the second display area; and the third driver is configured to apply first scan signals to the first scan lines of the first display area and second scan signals to the second scan lines of the second display area.

6. The flexible display device of claim 5, further comprising:

a third display area including third data lines arranged in the first direction, and third scan lines arranged in the second direction;

a first bending area between the third display area and the first display area; and first scan connecting lines disposed in the first bending area and connected to the first scan lines and the second scan lines.

7. The flexible display device of claim 1, wherein:

the first driver is configured to apply first scan signals to the first scan lines of the first display area;

the second driver is configured to apply second scan signals to the second scan lines of the second display area; and the third driver is configured to apply first data voltages to the first data lines of the first display area and second data voltages to the second data lines of the second display area.

8. The flexible display device of claim 7, further comprising:

pads disposed in a pad area between the first display area and the second display area; and a flexible circuit board attached on the pads.

9. The flexible display device of claim 8, wherein the third driver is disposed in the pad area, and wherein the pads are electrically connected to the third driver.

10. A flexible display device comprising:

a first display area including first data lines arranged in a first direction, and first scan lines arranged in a second direction intersecting the first direction;

a second display area including second data lines arranged in the first direction, and second scan lines arranged in the second direction;

a third display area including third data lines arranged in the first direction, and third scan lines arranged in the second direction;

a first bending area between the third display area and the first display area;

a fourth display area including fourth data lines arranged in the first direction, and fourth scan lines arranged in the second direction;

a second bending area between the fourth display area and the second display area;

a first driver adjacent to a side of the first display area;

a second driver adjacent to a side of the second display area;

a third driver between the first display area and the second display area; and first data connecting lines disposed in the first bending area and connected to the first data lines and the third data lines.

11. The flexible display device of claim 10, further comprising second data connecting lines disposed in the second bending area and connected to the second data lines and the fourth data lines.

12. The flexible display device of claim 11, further comprising:

a fourth driver adjacent to a side of the third display area; and a fifth driver adjacent to a side of the fourth display area.

13. The flexible display device of claim 12, wherein:

the fourth driver is configured to apply third scan signals to the third scan lines of the third display area; and the fifth driver is configured to apply fourth scan signals to the fourth scan lines of the fourth display area.

14. The flexible display device of claim 13, further comprising:

first carry signal lines disposed in the first bending area and connected to the first and fourth drivers; and second carry signal lines disposed in the second bending area and connected to the second and fifth drivers.

15. The flexible display device of claim 13, wherein the third driver is configured to apply first data voltages to the first data lines, the first connecting lines, and the third data lines during a first period, and apply second data voltages to the second data lines, the second connecting lines, and the fourth data lines during the first period.

16. The flexible display device of claim 15, wherein the first driver is configured to apply first scan signals to the first scan lines during the first period, and wherein the second driver is configured to apply second scan signals to the second scan lines during the first period.

17. The flexible display device of claim 13, wherein the third driver is configured to apply third data voltages to the first data lines, the first connecting lines, and the third data lines during a second period, and apply fourth data voltages to the second data lines, the second connecting lines, and the fourth data lines during the second period.

18. The flexible display device of claim 17, wherein the third driver is configured to apply the third scan signals to the third scan lines during the second period, and wherein the fourth driver is configured to apply the fourth scan signals to the fourth scan lines during the second period.

19. A flexible display device comprising:
a first display area including first data lines arranged in a first direction, and first scan lines arranged in a second direction intersecting the first direction;
a second display area including second data lines arranged in the first direction, and second scan lines arranged in the second direction;
a third display area including third data lines arranged in the first direction, and third scan lines arranged in the second direction;
a first bending area between the third display area and the first display area;
a fourth display area including fourth data lines arranged in the first direction, and fourth scan lines arranged in the second direction;
a second bending area between the fourth display area and the second display area;
a first driver adjacent to a side of the first display area;
a second driver adjacent to a side of the second display area;
a third driver between the first display area and the second display area;
first scan connecting lines disposed in the first bending area and connected to the first scan lines and the second scan lines; and
second scan connecting lines disposed in the second bending area and connected to the second scan lines and the fourth scan lines.

20. The flexible display device of claim 19, further comprising:
a fourth driver configured to apply third data voltages to the third data lines of the third display area; and
a fifth driver configured to apply fourth data voltages to the fourth data lines of the fourth display area.

* * * * *